(12) United States Patent
Li

(10) Patent No.: US 10,111,307 B2
(45) Date of Patent: Oct. 23, 2018

(54) SYSTEMS AND METHODS FOR REMOTELY CONTROLLING AN IMITATION CANDLE DEVICE

(71) Applicant: Xiaofeng Li, Shenzhen (CN)

(72) Inventor: Xiaofeng Li, Shenzhen (CN)

(*) Notice: Subject to any disclaimer, the term of this patent is extended or adjusted under 35 U.S.C. 154(b) by 0 days.

(21) Appl. No.: 15/197,354

(22) Filed: Jun. 29, 2016

(65) Prior Publication Data

US 2017/0367163 A1 Dec. 21, 2017

(30) Foreign Application Priority Data

Jun. 17, 2016 (CN) .......................... 2016 1 0437230

(51) Int. Cl.
H05B 33/08 (2006.01)
H05B 37/02 (2006.01)
F21S 6/00 (2006.01)
F21S 10/04 (2006.01)
F21S 9/02 (2006.01)
(Continued)

(52) U.S. Cl.
CPC .......... *H05B 37/0272* (2013.01); *F21S 6/001* (2013.01); *F21S 9/02* (2013.01); *F21S 10/046* (2013.01); *F21V 33/0056* (2013.01); *G05B 15/02* (2013.01); *H05B 33/0815* (2013.01); *H05B 33/0854* (2013.01); *H05B 33/0872* (2013.01); *H05B 37/0227* (2013.01);
(Continued)

(58) Field of Classification Search
CPC . F21S 6/001; F21S 9/02; F21S 10/046; F21Y 2115/10; G05B 15/02; F21V 33/0056; H05B 33/0815; H05B 33/0854; H05B 33/0872; H05B 37/0227; H05B 37/0236; H05B 37/0272; H05B 37/0281
See application file for complete search history.

(56) References Cited

U.S. PATENT DOCUMENTS 1,507,371 A 8/1924 Goodridge
1,842,167 A 1/1932 Hall
(Continued)

FOREIGN PATENT DOCUMENTS

CN 1030823 2/1989
CN 2483103 3/2002
(Continued)

OTHER PUBLICATIONS

U.S. Appl. No. 61/101,611 to Schnuckle, filed Sep. 30, 2008.
(Continued)

*Primary Examiner* — Alexander H Taningco
*Assistant Examiner* — Kurtis R Bahr
(74) *Attorney, Agent, or Firm* — Perkins Coie LLP

(57) ABSTRACT

Imitation candle devices and systems with enhanced features are described that facilitate remote operation and usage of electronic candles. The disclosed features include application programs running on a processor of a mobile device and a detachable wireless transceiver included within an imitation candle to facilitate the electronic candle to be turned on or off remotely. In some embodiments, when a user blows into the microphone of the mobile device the imitation flame of the electronic candle is moved according to the speed of the blow. In some implementations, parameters such as a flicker speed, a flicker color, a duration of flickering, are changed using signals that are received from the mobile device.

28 Claims, 14 Drawing Sheets

(51) Int. Cl.
    *F21V 33/00*     (2006.01)
    *G05B 15/02*     (2006.01)
    *F21Y 115/10*     (2016.01)

(52) U.S. Cl.
    CPC ..... *H05B 37/0236* (2013.01); *H05B 37/0281* (2013.01); *F21Y 2115/10* (2016.08)

(56) References Cited

U.S. PATENT DOCUMENTS

| | | | |
|---|---|---|---|
| 1,955,042 A | 4/1934 | Work | |
| D102,561 S | 12/1936 | Lamb | |
| 2,435,811 A | 2/1948 | Waters | |
| 2,932,351 A | 6/1958 | Bried | |
| 2,976,450 A | 3/1961 | Benoliel | |
| 2,984,032 A | 5/1961 | Cornell | |
| 3,166,863 A | 1/1965 | Gray | |
| 3,233,093 A | 2/1966 | Gerlat | |
| 3,373,274 A | 3/1968 | Kott | |
| 3,384,774 A | 5/1968 | English | |
| 3,425,157 A | 2/1969 | Hartsock | |
| 3,479,561 A | 11/1969 | Janning | |
| 3,514,660 A | 5/1970 | Kopelman | |
| 3,603,013 A | 9/1971 | Gardiner | |
| 3,639,749 A | 2/1972 | Beckman | |
| 3,681,588 A | 8/1972 | Lee | |
| 3,814,973 A | 6/1974 | Thouret et al. | |
| 3,890,085 A | 6/1975 | Andeweg | |
| 4,026,544 A | 5/1977 | Plambeck et al. | |
| 4,067,111 A | 1/1978 | Truitt | |
| 4,187,532 A | 2/1980 | Naffier | |
| 4,328,534 A | 5/1982 | Abe | |
| 4,477,249 A | 10/1984 | Ruzek et al. | |
| 4,550,363 A | 10/1985 | Sandell | |
| 4,551,794 A | 11/1985 | Sandell | |
| 4,617,614 A | 10/1986 | Lederer | |
| 4,728,871 A | 3/1988 | Andrews | |
| 4,764,853 A | 8/1988 | Thomas | |
| 4,777,571 A | 10/1988 | Morgan | |
| 4,866,580 A | 9/1989 | Blackerby | |
| 4,965,707 A | 10/1990 | Butterfield | |
| 5,072,208 A | 12/1991 | Christensen | |
| 5,097,180 A | 3/1992 | Ignon et al. | |
| 5,152,602 A | 10/1992 | Boschetto | |
| 5,381,325 A | 1/1995 | Messana | |
| 5,550,452 A | 8/1996 | Shirai | |
| 5,582,478 A | 12/1996 | Ambrosino | |
| 5,707,282 A | 1/1998 | Clements et al. | |
| 5,920,827 A * | 7/1999 | Baer .................. | G01W 1/02 |
| | | | 702/3 |
| 5,924,784 A | 7/1999 | Chliwnyj et al. | |
| 5,936,521 A | 8/1999 | Blackman | |
| 6,198,229 B1 * | 3/2001 | McCloud ................ | F21S 10/04 |
| | | | 315/154 |
| 6,241,362 B1 | 6/2001 | Morrison | |
| 6,257,755 B1 | 7/2001 | Sevelle | |
| 6,302,555 B1 | 10/2001 | Bristow | |
| 6,312,137 B1 | 11/2001 | Hsieh | |
| 6,454,425 B1 | 9/2002 | Lin | |
| 6,461,011 B1 | 10/2002 | Harrison | |
| 6,491,516 B1 | 12/2002 | Tal et al. | |
| 6,511,219 B2 | 1/2003 | Sevelle | |
| D486,924 S | 2/2004 | Skradski et al. | |
| 6,688,752 B2 | 2/2004 | Moore | |
| 6,712,493 B2 | 3/2004 | Tell et al. | |
| 6,757,487 B2 | 6/2004 | Martin et al. | |
| 6,781,270 B2 | 8/2004 | Long | |
| 6,953,401 B2 | 10/2005 | Starr | |
| 6,955,440 B2 | 10/2005 | Niskanen | |
| 6,966,665 B2 | 11/2005 | Limburg et al. | |
| 7,029,146 B2 | 4/2006 | Kitchen | |
| 7,066,637 B2 | 6/2006 | Nozawa | |
| 7,080,472 B2 | 7/2006 | Schroeter et al. | |
| 7,083,315 B2 | 8/2006 | Hansler et al. | |
| 7,093,949 B2 | 8/2006 | Hart et al. | |
| 7,111,421 B2 | 9/2006 | Corry et al. | |
| 7,118,243 B2 | 10/2006 | McCavit et al. | |
| 7,125,142 B2 | 10/2006 | Wainwright | |
| 7,159,994 B2 | 1/2007 | Schnuckle et al. | |
| D545,458 S | 6/2007 | Jensen | |
| 7,261,455 B2 | 8/2007 | Schnuckle et al. | |
| 7,300,179 B1 | 11/2007 | LaDuke et al. | |
| 7,305,783 B2 | 12/2007 | Mix et al. | |
| D567,993 S | 4/2008 | Shiu | |
| 7,360,935 B2 | 4/2008 | Jensen et al. | |
| D576,317 S | 9/2008 | Jensen | |
| D589,176 S | 3/2009 | Huang et al. | |
| D599,491 S | 9/2009 | Luo | |
| 7,633,232 B2 | 12/2009 | Wong | |
| 7,677,753 B1 * | 3/2010 | Wills ....................... | F21S 6/00 |
| | | | 362/161 |
| 7,686,471 B2 | 3/2010 | Reichow | |
| RE41,628 E | 9/2010 | Barbeau | |
| 7,824,627 B2 | 11/2010 | Michaels et al. | |
| 7,828,462 B2 | 11/2010 | Jensen et al. | |
| 7,837,355 B2 | 11/2010 | Schnuckle | |
| 8,070,319 B2 | 12/2011 | Schnuckle et al. | |
| 8,081,872 B2 | 12/2011 | Wang | |
| 8,132,936 B2 | 3/2012 | Patton et al. | |
| 8,210,708 B2 | 7/2012 | Negron | |
| 8,235,558 B1 | 8/2012 | Lauer | |
| 8,256,935 B1 * | 9/2012 | Cullimore ............... | F21S 6/001 |
| | | | 362/276 |
| 8,342,712 B2 | 1/2013 | Patton et al. | |
| 8,454,190 B2 | 6/2013 | Negron | |
| 8,534,869 B2 | 9/2013 | Patton et al. | |
| 8,550,660 B2 | 10/2013 | Patton et al. | |
| 8,646,946 B2 | 2/2014 | Schnuckle et al. | |
| 8,696,166 B2 | 4/2014 | Patton et al. | |
| 8,721,118 B2 | 5/2014 | Patton | |
| 8,727,569 B2 | 5/2014 | Schnuckle et al. | |
| 8,789,986 B2 | 7/2014 | Li | |
| 8,894,261 B2 | 11/2014 | Chen | |
| 8,926,137 B2 | 1/2015 | Li | |
| 8,998,461 B2 | 4/2015 | Gutstein et al. | |
| 9,033,553 B2 * | 5/2015 | Li ........................... | F21S 10/04 |
| | | | 362/311.01 |
| 9,052,078 B2 | 6/2015 | Sheng | |
| D740,460 S | 10/2015 | Thompson et al. | |
| D743,096 S | 11/2015 | Patton et al. | |
| D748,322 S | 1/2016 | Patton et al. | |
| D748,843 S | 2/2016 | Thompson et al. | |
| D752,276 S | 3/2016 | Thompson et al. | |
| 9,322,523 B2 | 4/2016 | Patton et al. | |
| 9,335,014 B2 | 5/2016 | Patton et al. | |
| 9,360,181 B2 * | 6/2016 | Li ........................... | F21V 33/0088 |
| 9,366,402 B2 | 6/2016 | Li | |
| 9,371,972 B2 | 6/2016 | Li | |
| 9,371,973 B2 | 6/2016 | Li | |
| 9,447,938 B2 | 9/2016 | Li | |
| 9,512,971 B2 | 12/2016 | Li | |
| 9,518,710 B2 | 12/2016 | Li | |
| 9,523,471 B2 | 12/2016 | Li | |
| 9,541,247 B2 | 1/2017 | Patton | |
| 9,551,470 B2 | 1/2017 | Li | |
| D779,707 S | 2/2017 | Thompson et al. | |
| 9,572,236 B2 | 2/2017 | Patton | |
| D781,488 S | 3/2017 | Patton | |
| 9,585,980 B1 | 3/2017 | Li | |
| 9,591,729 B2 | 3/2017 | Patton | |
| 9,605,824 B1 * | 3/2017 | Li ........................... | F21S 10/04 |
| 9,625,112 B2 | 4/2017 | Li | |
| 2001/0033488 A1 | 10/2001 | Chliwnyj et al. | |
| 2002/0080601 A1 | 6/2002 | Meltzer | |
| 2003/0041491 A1 | 3/2003 | Mix | |
| 2003/0053305 A1 | 3/2003 | Lin | |
| 2003/0072154 A1 | 4/2003 | Moore | |
| 2004/0114351 A1 | 6/2004 | Stokes et al. | |
| 2004/0165374 A1 | 8/2004 | Robinson | |
| 2004/0223326 A1 | 11/2004 | Wainwright | |
| 2005/0007779 A1 | 1/2005 | Nozawa | |
| 2005/0097792 A1 | 5/2005 | Naden | |
| 2005/0169812 A1 | 8/2005 | Helf | |
| 2005/0196716 A1 | 9/2005 | Haab | |

(56) References Cited

U.S. PATENT DOCUMENTS

| | | |
|---|---|---|
| 2005/0225984 A1 | 10/2005 | Theobald |
| 2005/0254248 A1 | 11/2005 | Lederer |
| 2005/0285538 A1 | 12/2005 | Jaworski et al. |
| 2006/0034079 A1 | 2/2006 | Schnuckle et al. |
| 2006/0034100 A1 | 2/2006 | Schnuckle et al. |
| 2006/0101681 A1 | 5/2006 | Hess et al. |
| 2006/0120080 A1 | 6/2006 | Sipinski et al. |
| 2006/0146544 A1 | 7/2006 | Leung |
| 2006/0158138 A1* | 7/2006 | Walter ............ A47G 19/025 315/316 |
| 2006/0192503 A1 | 8/2006 | Trombetta |
| 2007/0002560 A1 | 1/2007 | Gutstein et al. |
| 2007/0053174 A1 | 3/2007 | Lin |
| 2007/0109782 A1* | 5/2007 | Wolf ............... A01M 1/2083 362/253 |
| 2007/0127249 A1 | 6/2007 | Medley et al. |
| 2007/0154857 A1 | 7/2007 | Cho |
| 2007/0159422 A1 | 7/2007 | Blandino et al. |
| 2007/0223217 A1 | 9/2007 | Hsu |
| 2007/0236947 A1 | 10/2007 | Jensen et al. |
| 2008/0074875 A1 | 3/2008 | Jensen et al. |
| 2008/0112154 A1 | 5/2008 | Reichow |
| 2008/0129226 A1 | 6/2008 | DeWitt et al. |
| 2008/0130266 A1 | 6/2008 | DeWitt et al. |
| 2008/0151563 A1 | 6/2008 | Chen |
| 2008/0151571 A1 | 6/2008 | Tang |
| 2009/0059596 A1 | 3/2009 | Lederer |
| 2009/0135586 A1 | 5/2009 | Yang |
| 2010/0001662 A1* | 1/2010 | Nelkin ............... F21S 8/065 315/294 |
| 2010/0079999 A1 | 4/2010 | Schnuckle |
| 2010/0134022 A1 | 6/2010 | Gutstein et al. |
| 2010/0207538 A1 | 8/2010 | Chen |
| 2011/0000666 A1 | 1/2011 | Couto |
| 2011/0019422 A1* | 1/2011 | Schnuckle ......... F21S 10/04 362/277 |
| 2011/0110073 A1 | 5/2011 | Schnuckle et al. |
| 2011/0127914 A1 | 6/2011 | Patton |
| 2011/0195787 A1 | 8/2011 | Wells |
| 2011/0204828 A1 | 8/2011 | Moody et al. |
| 2011/0317403 A1 | 12/2011 | Fournier et al. |
| 2012/0049765 A1* | 3/2012 | Lu ..................... F21S 6/001 315/312 |
| 2012/0093491 A1 | 4/2012 | Browder |
| 2012/0134157 A1 | 5/2012 | Li |
| 2013/0050985 A1 | 2/2013 | Kwok et al. |
| 2013/0163249 A1 | 6/2013 | Miura |
| 2013/0223043 A1 | 8/2013 | Ray |
| 2013/0265748 A1 | 10/2013 | Negron |
| 2014/0035483 A1 | 2/2014 | Becker |
| 2014/0104820 A1* | 4/2014 | Chiang ............... F21S 9/02 362/183 |
| 2014/0140042 A1 | 5/2014 | Schreiber |
| 2014/0211499 A1 | 7/2014 | Fong |
| 2014/0218903 A1 | 8/2014 | Sheng |
| 2014/0254148 A1 | 9/2014 | Fournier |
| 2014/0268652 A1 | 9/2014 | Li |
| 2014/0268704 A1 | 9/2014 | Yang |
| 2014/0274212 A1 | 9/2014 | Zurek et al. |
| 2014/0286024 A1 | 9/2014 | Li |
| 2014/0313694 A1 | 10/2014 | Patton |
| 2014/0362592 A1 | 12/2014 | Lee |
| 2015/0008845 A1 | 1/2015 | Kim |
| 2015/0036348 A1 | 2/2015 | Dong |
| 2015/0070874 A1 | 3/2015 | Beesley |
| 2015/0109786 A1 | 4/2015 | Li |
| 2015/0124442 A1 | 5/2015 | Ding |
| 2015/0233538 A1 | 8/2015 | Sheng |
| 2015/0292698 A1 | 10/2015 | Li |
| 2015/0308643 A1 | 10/2015 | Huang |
| 2015/0319828 A1* | 11/2015 | Moon ............... H05B 33/0803 315/158 |
| 2015/0330587 A1* | 11/2015 | Lax ................... F21S 9/022 362/191 |
| 2015/0369431 A1 | 12/2015 | Li |
| 2015/0369432 A1 | 12/2015 | Li |
| 2015/0373815 A1 | 12/2015 | Patton |
| 2016/0029461 A1 | 1/2016 | Noh et al. |
| 2016/0040844 A1 | 2/2016 | Patton |
| 2016/0047517 A1 | 2/2016 | Li |
| 2016/0057829 A1 | 2/2016 | Li |
| 2016/0109082 A1 | 4/2016 | Li |
| 2016/0109083 A1 | 4/2016 | Li |
| 2016/0163630 A1 | 6/2016 | Kummerl |
| 2016/0186947 A1 | 6/2016 | Li |
| 2016/0258584 A1 | 9/2016 | Li |
| 2016/0290580 A1 | 10/2016 | Li |
| 2016/0312969 A1 | 10/2016 | Patton |
| 2016/0348864 A1 | 12/2016 | Li |
| 2017/0023196 A1 | 1/2017 | Li |
| 2017/0067606 A1 | 3/2017 | Hau et al. |
| 2017/0082256 A1 | 3/2017 | Li |

FOREIGN PATENT DOCUMENTS

| | | | |
|---|---|---|---|
| CN | 2551859 | | 5/2003 |
| CN | 2562059 Y | | 7/2003 |
| CN | 1530142 A | | 9/2004 |
| CN | 1646177 A | | 7/2005 |
| CN | 2854329 Y | | 1/2007 |
| CN | 2888274 Y | | 4/2007 |
| CN | 2924266 | | 7/2007 |
| CN | 200940808 Y | | 8/2007 |
| CN | 201011621 Y | | 1/2008 |
| CN | 201059432 Y | | 5/2008 |
| CN | 201093300 | | 7/2008 |
| CN | 201103952 Y | | 8/2008 |
| CN | 201159425 Y | | 12/2008 |
| CN | 101408284 A | | 4/2009 |
| CN | 201235095 Y | | 5/2009 |
| CN | 101598264 A | * | 12/2009 |
| CN | 201418887 Y | | 3/2010 |
| CN | 201533921 U | | 7/2010 |
| CN | 101865413 A | | 10/2010 |
| CN | 201643048 U | | 11/2010 |
| CN | 102147095 A | | 8/2011 |
| CN | 102563510 A | | 7/2012 |
| CN | 102734740 A | | 10/2012 |
| CN | 102748589 A | | 10/2012 |
| CN | 202708962 U | | 1/2013 |
| CN | 202791780 U | | 3/2013 |
| CN | 203131550 | | 8/2013 |
| CN | 103322500 A | | 9/2013 |
| CN | 20329818 U | | 11/2013 |
| CN | 203273669 | | 11/2013 |
| CN | 203273670 U | | 11/2013 |
| CN | 203431703 U | | 2/2014 |
| CN | 203442498 U | | 2/2014 |
| CN | 203517611 U | | 4/2014 |
| CN | 203571618 U | | 4/2014 |
| CN | 104048246 | | 9/2014 |
| CN | 104089241 | | 10/2014 |
| CN | 203940346 | | 11/2014 |
| CN | 204268356 | | 4/2015 |
| DE | 1489617 A1 | | 5/1969 |
| DE | 212011100014 U1 | | 4/2012 |
| DE | 102012206988 A1 | | 10/2013 |
| DE | 202014100821 U1 | | 4/2014 |
| DE | 202013012047 | | 4/2015 |
| DE | 202015000490 | | 4/2015 |
| DE | 202015102274 | | 6/2015 |
| EP | 0138786 A1 | | 4/1985 |
| EP | 0855189 A2 | | 7/1998 |
| EP | 1639291 B1 | | 3/2006 |
| EP | 1838110 A1 | | 9/2007 |
| EP | 2587127 A1 | | 5/2013 |
| GB | 499745 | | 1/1939 |
| GB | 2230335 | | 10/1990 |
| GB | 2267746 | | 12/1993 |
| GB | 2323159 A | | 9/1998 |
| GB | 2379731 A | | 3/2003 |
| GB | 2385413 A | | 8/2003 |
| GB | 2443926 | | 5/2008 |

(56) References Cited

FOREIGN PATENT DOCUMENTS

| | | | |
|---|---|---|---|
| GB | 2455598 A | 6/2009 |
| GB | 2527626 | 12/2015 |
| JP | H0652709 | 2/1994 |
| JP | H1057464 A | 3/1998 |
| JP | 2000284730 A | 10/2000 |
| JP | 2008180755 A | 8/2008 |
| KR | 101174246 | 8/2012 |
| WO | WO-1982002756 A1 | 8/1982 |
| WO | WO-1985003561 A1 | 8/1985 |
| WO | WO-1987004506 A1 | 7/1987 |
| WO | WO-1996025624 A1 | 8/1996 |
| WO | WO-2001092780 | 12/2001 |
| WO | WO-2003011349 | 2/2003 |
| WO | WO-2006020839 A2 | 2/2006 |
| WO | WO2007002560 A1 | 1/2007 |
| WO | WO-2008092753 A2 | 8/2008 |
| WO | WO2010009575 | 1/2010 |
| WO | WO-2012000418 A1 | 1/2012 |
| WO | WO2012099718 | 7/2012 |
| WO | WO2012162538 A1 | 11/2012 |
| WO | WO-2013020263 A2 | 2/2013 |
| WO | WO2013020439 | 2/2013 |
| WO | WO2014139483 A1 | 9/2014 |
| WO | WO2016000517 A1 | 1/2016 |

OTHER PUBLICATIONS

U.S. Appl. No. 61/293,516 to Patton, filed Jan. 8, 2010.
International Search Report and Written Opinion for PCT Application No. PCT/CN/2014/073557 dated Jul. 2, 2014.
International Search Report for PCT Application No. PCT/US2009/054401 dated Oct. 26, 2009.
EP Search Report for European Patent Application No. 12185984.7 dated Dec. 14, 2012.
Engineer's Handbook (Epoxy definition), http://engineershandbook.com/Materials/epoxy.htm, Jul. 18, 2013.
Nagashima, H. et al., "Introduction to Chaos, Physics and Mathematics of Chaotic Phenomena," Institute of Physics Publishing, 1999.
Definition of "Electromagnet" in the Encarta World English Dictionary, Aug. 1999.
Lab M3: The Physical Pendulum, Physics 1140—Experimental Physics, Course Laboratory Instructions, 2000.
U.S. Appl. No. 15/137,951, filed Apr. 25, 2016, Li.
U.S. Appl. No. 15/145,739, filed May 3, 2016, Li.
U.S. Appl. No. 15/150,057, filed May 9, 2016.
U.S. Appl. No. 15/197,354, filed Jun. 29, 2016.
U.S. Appl. No. 15/293,200, filed Oct. 13, 2016, Li.
U.S. Appl. No. 15/336,553, filed Oct. 27, 2016, Li.
Notice of Allowance for U.S. Appl. No. 13/325,754 dated Jun. 18, 2014, 10 pages.
Non-Final Office Action for U.S. Appl. No. 13/325,754 dated Dec. 30, 2013, 14 pages.
Notice of Allowance for U.S. Appl. No. 14/161,143, dated Nov. 13, 2014, 18 pages.
Final Office Action for U.S. Appl. No. 14/161,143, dated Oct. 20, 2014, 15 pages.
Non-Final Office Action for U.S. Appl. No. 14/161,143 dated Apr. 30, 2014, 18 pages.
Non-Final Office Action for U.S. Appl. No. 14/558,507 dated Sep. 2, 2015, 21 pages.
Notice of Allowance for U.S. Appl. No. 14/588,507 dated Dec. 4, 2015, 11 pages.
Non-Final Office Action for U.S. Appl. No. 14/558,507 dated Mar. 17, 2016, 18 pages.
Notice of Allowance for U.S. Appl. No. 14/588,507 dated May 3, 2016, 7 pages.
Non-Final Office Action for U.S. Appl. No. 14/925,893 dated Feb. 25, 2016, 37 pages.
Final Office Action for U.S. Appl. No. 14/925,893, dated Apr. 26, 2016, 29 pages.
Non-Final Office Action for U.S. Appl. No. 14/925,893 dated May 16, 2016, 13 pages.
Non-Final Office Action for U.S. Appl. No. 14/925,899 dated Jan. 5, 2016, 21 pages.
Non-Final Office Action for U.S. Appl. No. 14/925,899 dated Apr. 14, 2016, 25 pages.
Non-Final Office Action for U.S. Appl. No. 14/927,213 dated Feb. 25, 2016, 33 pages.
Notice of Allowance for U.S. Appl. No. 14/927,213 dated May 11, 2016, 12 pages.
Non-Final Office Action for U.S. Appl. No. 14/925,899 dated May 25, 2016, 18 pages.
Supplementary Search Report and Opinion for EP 14764844, dated Jul. 28, 2016, 12 pages.
Non-Final Office Action for U.S. Appl. No. 15/145,739 dated Jul. 27, 2016, 22 pages.
Notice of Allowance for U.S. Appl. No. 14/925,893, dated Jul. 20, 2016, 9 pages.
Notice of Allowance for U.S. Appl. No. 14/925,899, dated Aug. 3, 2016, 9 pages.
Non-Final Office Action for U.S. Appl. No. 15/061,648 dated Jul. 12, 2016, 47 pages.
Non-Final Office Action for U.S. Appl. No. 14/449,865 dated Feb. 3, 2016, 9 pages.
Fianl Office Action for U.S. Appl. No. 14/928,696 dated Jul. 14, 2016, 27 pages.
International Search Report for PCT/CN2014/091362 dated Apr. 3, 2015, 2 pages.
Non-Final Office Action for U.S. Appl. No. 15/187,618, dated Aug. 18, 2016, 13 pages.
Final Office Action for U.S. Appl. No. 13/908,571 dated Sep. 30, 2014, 18 pages.
Final Office Action for U.S. Appl. No. 13/908,571 dated Mar. 18, 2014, 21 pages.
Non-Final Office Action for U.S. Appl. No. 13/908,571 dated Sep. 6, 2013, 12 pages.
Notice of Allowance for U.S. Appl. No. 13/526,067 dated Feb. 6, 2013, 8 pages.
Non-Final Office Action for U.S. Appl. No. 13/526,067 dated Oct. 22, 2012, 23 pages.
Final Office Action for U.S. Appl. No. 12/273,337 dated Jan. 18, 2012, 17 pages.
Notice of Allowance for U.S. Appl. No. 12/273,337 dated Mar. 26, 2012, 8 pages.
Non-Final Office Action for U.S. Appl. No. 12/273,337 dated Jun. 17, 2011, 17 pages.
Notice of Allowance for U.S. Appl. No. 15/158,508, dated Sep. 21, 2016, 8 pages.
Notice of Allowance for U.S. Appl. No. 15/061,648, dated Sep. 23, 2016, 9 pages.
Non-Final Office Action for U.S. Appl. No. 15/137,951, dated Oct. 24, 2016, 28 pages.
UK Combined Search and Examination Report for GB1613387.8, dated Sep. 9, 2016, 10 pages.
UK Combined Search and Examination Report for GB1613393.6, dated Sep. 9, 2016, 10 pages.
Canadian Examination and Search Report for CA2936224, dated Sep. 30, 2016, 5 pages.
UK Combined Search and Examination Report for GB1613391.0, dated Sep. 19, 2016, 9 pages.
Notice of Allowance for U.S. Appl. No. 14/449,865 dated Nov. 16, 2016, 15 pages.
Notice of Allowance for U.S. Appl. No. 15/145,739 dated Nov. 17, 2016, 11 pages.
Notice of Allowance for U.S. Appl. No. 15/187,618 dated Nov. 30, 2016, 12 pages.
U.S. Appl. No. 15/411,869, filed Jan. 20, 2017, Li.
U.S. Appl. No. 15/413,305, filed Jan. 23, 2017, Li.
U.S. Appl. No. 15/150,057, filed May 9, 2016, Li.
U.S. Appl. No. 15/322,237, filed Nov. 11, 2014, Li.
U.S. Appl. No. 15/418,451, filed Jan. 27, 2017, Li.

(56) References Cited

OTHER PUBLICATIONS

U.S. Appl. No. 15/441,143, filed Feb. 23, 2017, Li.
U.S. Appl. No. 15/451,351, filed Mar. 6, 2017, Li.
U.S. Appl. No. 15/368,168, filed Dec. 2, 2016, Li.
U.S. Appl. No. 15/451,361, filed Mar. 6, 2017, Li.
Canadian Examination and Search Report for CA2936225, dated Sep. 29, 2016, 5 pages.
Non-Final Office Action for U.S. Appl. No. 15/371,103, dated Jan. 25, 2017, 45 pages.
Notice of Allowance for Canadian Patent Application No. 2,930,065, dated Feb. 9, 2017 from the Canadian Intellectual Property Office.
Canadian Examination Report for CA2930099, dated Jan. 5, 2017 from the Canadian Intellectual Property Office, 3 pages.
Translated Office Action issued by the German patent and Trade Mark Office dated Dec. 19, 2016 for Application No. 102016008225.9, 5 pages.
Notice of Allowance for 2017, U.S. Appl. No. 15/207,411 dated Jan. 20, 2017, 23 pages.
Notice of Allowance for Canadian Patent Application No. 2,936,225, dated Jan. 16, 2017 from the Canadian Intellectual Property Office.
Canadian Examination Report for CA2936224, dated Feb. 9, 2017 from the Canadian Intellectual Property Office, 5 pages.
Notice of Allowance for U.S. Appl. No. 15/137,951 dated Feb. 28, 2017, 10 pages.
Non-Final Office Action for U.S. Appl. No. 15/368,168, dated Mar. 13, 2017, 36 pages.
Translated Office Action issued by the German patent and Trade Mark Office on Mar. 16, 2017 for Application No. 102016008825.7, 8 pages.
Non-Final Office Action for U.S. Appl. No. 15/355,408, dated Feb. 8, 2017, 26 pages.
Notice of Allowance for U.S. Appl. No. 14/672,819, dated Jan. 27, 2017, 14 pages.
Translated Office Action issued by the German patent and Trade Mark Office dated Feb. 16, 2017 for Application No. 102016008226.7, 6 pages.
Notice of Allowance for U.S. Appl. No. 15/371,103 dated Apr. 12, 2017, 10 pages.
Translated Office Action issued by the German patent and Trade Mark Office dated Mar. 2, 2017 for Application No. 102016009125.8, 5 pages.
MiPow Playbulb Candle, Android, http://www.mipow.de/smart-home/29/mipow-playbulb-candle, archived on http://www.archive.org on May 14, 2016 [accessed Mar. 2, 2017].
CHIP: Progimax Candle, http://beste-apss.chip.de/android/app/kostenloses-candle-kerzen-app-fuer-den-androiden.com.progimax.candle.free/ , archived on http://www.archive.org on Dec. 30, 2013 [accessed on Mar. 2, 2017].

* cited by examiner

SYSTEMS AND METHODS FOR REMOTELY CONTROLLING AN IMITATION CANDLE DEVICE

RELATED APPLICATIONS

This patent document claims priority to the Chinese patent application no. CN201610437230.3 filed on Jun. 17, 2016. The entire contents of the before mentioned Chinese patent application is incorporated by reference in this patent document.

FIELD OF INVENTION

The subject matter of this patent document relates to systems and method for remotely controlling imitation candle devices that use an imitation flame, and particularly, communication methods and systems that facilitate remotely controlling operative features of such imitation candle devices.

BACKGROUND

Traditional true flame candles, when lit, provide a pleasant ambience in many homes, hotels, churches, businesses, etc. Traditional candles, however, provide a variety of hazards including risk of fire, damage to surfaces caused by hot wax, and the possible emission of soot. Flameless candles have become increasingly popular alternatives to traditional candles. With no open flame or hot melted wax, flameless candles provide a longer-lasting, safe, and clean alternative. Such imitation candle devices often include light sources, such as LEDs, and include electronic circuits that control the operation the imitation candle device.

SUMMARY OF CERTAIN EMBODIMENTS

The disclosed embodiments relate to devices and methods for facilitating the operations and control of electronic candle devices. The disclosed features enable an electronic candle device to be controlled remotely (e.g., via a user's mobile device) using wireless communication methodologies.

One exemplary aspect of the disclosed embodiments relates to an imitation candle device that includes a removable wireless transceiver attachable to the imitation candle device and configured to communicate wirelessly with a mobile device of a user for controlling one or more operative features of the imitation candle device to produce an appearance of a true fire flame.

Another exemplary aspect of the disclosed embodiments relates to processor-executable, non-transitory computer-readable medium included within the mobile user device and configured to communicate wirelessly with the wireless transceiver. The non-transitory computer-readable medium includes a set of instructions that, when executed by one or more processors in the mobile user device, are configured to detect, via a sensor on the mobile user device, a breeze in close proximity to the mobile user device, calculate a speed of movement of the breeze, identifying a pattern associated with the speed of movement of the breeze, and transmit a wireless signal to the removable wireless transceiver for modulating parameters of a light source included in the imitation candle device based on the identified pattern.

Another exemplary aspect of the disclosed embodiments relates to a non-transitory computer-readable medium included within a mobile user device and configured to communicate wirelessly with the wireless transceiver of the imitation candle device. The non-transitory computer-readable medium includes a set of instructions that, when executed by one or more processors in the mobile user device, transmit wireless signals that allow control of one or more operative features of the imitation candle device. Examples of such operative features can be a power-on or power-off operation, an activation of a blow off feature of the imitation candle device in response to detection of an acoustic wave received via a microphone on the mobile user device, a selection of a particular imitation candle device, a selection of a timer feature, a setting of a timer value, a selection of a light intensity level, an adjustment of a light intensity level, a selection of a movement of the flame element, a setting of a level of movement of the flame element, or a selection of a group of imitation candle devices.

DETAILED DESCRIPTION OF CERTAIN EMBODIMENTS

In this patent document, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner. The terms "application," "application program," "application running on a mobile device," "mobile application," or "mobile application program" are considered generally synonymous in usage.

Imitation candle devices can simulate a real candle with a flame that resembles a real-life flame with flickering effects using optical, mechanical and electrical components. The disclosed embodiments provide further features and functionalities that enhance the operation of these devices, and in some cases, enable additional features that cannot be obtained with real candles.

Figure 1:
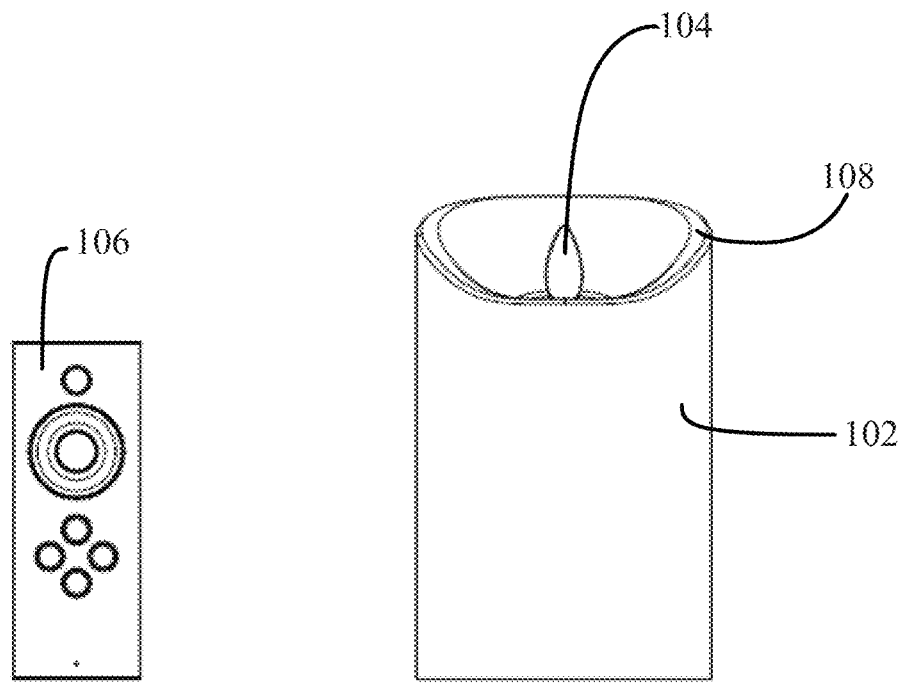
FIG. 1 illustrates an exemplary imitation candle device with an associated remote control device and a removable wireless transceiver attachable to the imitation candle device.
Figure 1:
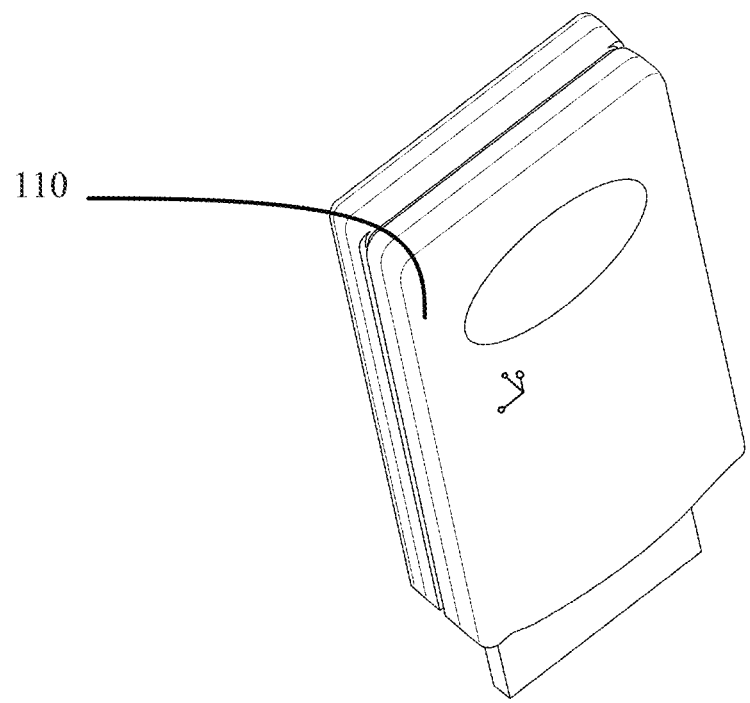

FIG. 1 illustrates an exemplary imitation candle device 102 with an associated remote control device 106 and a detachable dongle 110 (also referred to herein generally as removable wireless transceiver) in accordance with an exemplary embodiment. The flame element 104 protrudes upward from the body of the imitation candle device 102, and the top portion 108 of the body is formed to resemble a melted candle wax to enhance the resemblance of the candle device 102 to a real candle. In some embodiments, an imitation candle device 102 can be remotely operated using a user's mobile device (e.g., a smart phone, a tablet device, a laptop computer, or a wearable electronic device such as a watch or other accessories). The term "mobile device" is used fairly broadly in context and not limited to the aforementioned examples and can also include a remote control device. For example, the detachable dongle 110 can be an add-on feature and attach to an imitation candle device 102 by a simple insert-and-operate mechanism. Thus, it will be understood and appreciated that disclosed detachable dongle 110 can be inserted as an add-on feature to any imitation candle device and not necessarily limited to a specific type of imitation candle. When detachable dongle 110 is attached to imitation candle device 102, the imitation candle device 102 can be operated by any electronic device that communicates with detachable dongle 110 (specifically, a transceiver or circuitry included therein) via Bluetooth Low Energy (BLE) protocol. In some embodiments, one or more other wireless protocols and techniques, such as cellular, WiFi, WiMax, etc., can be used for the communication. In some applications, the communication channel that allows remote control of the imitation candle device can include a wired communication channel. In some embodiments, a remote control device 106 is optionally provided for the operation of imitation candle device 102. The remote control device 106 can be configured to operate with the imitation candle device 102 via a wireless (e.g., infrared) channel. For example, the remote control device 106 can include an infrared transmitter to provide various commands and signals to an infrared receiver of the imitation candle device 102. Remote control device 106 can be, in lieu of, or in addition to, the detachable dongle 110.

Figure 2A:
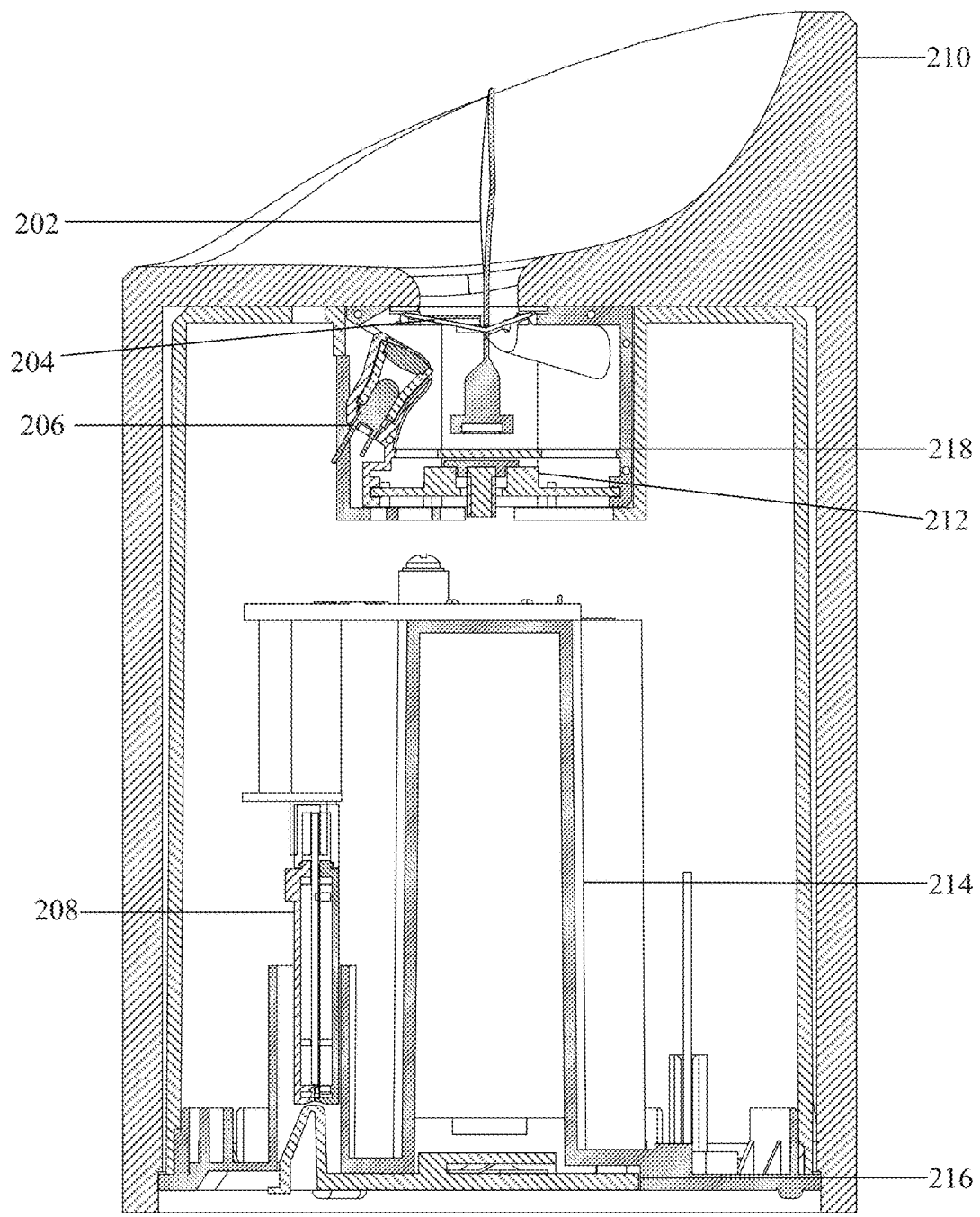
FIG. 2(A) illustrates certain components including a mechanism for receiving a removable wireless transceiver within an exemplary imitation candle device.
Figure 2B:
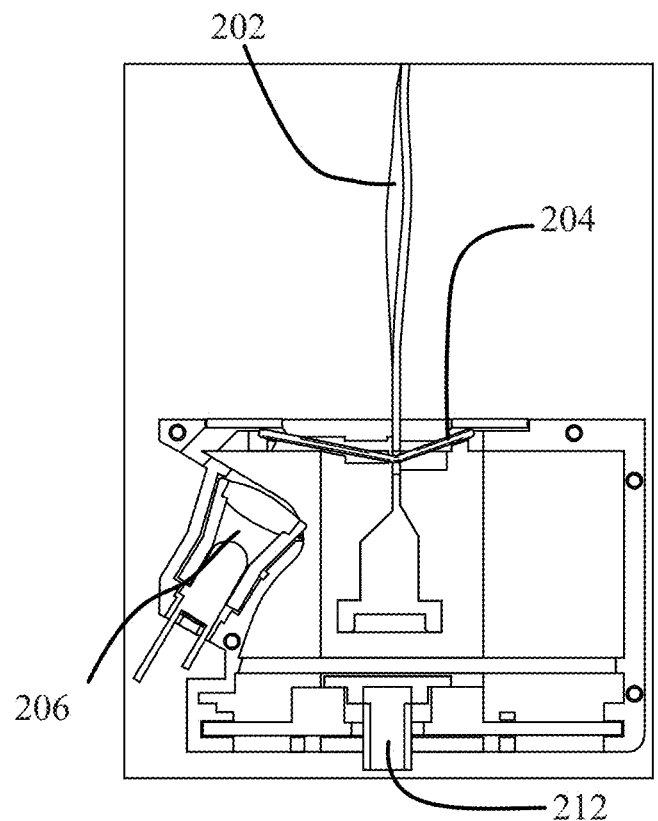
FIG. 2(B) illustrates a side view including certain internal candle components of the imitation candle device.

FIG. 2(A) illustrates some of the mechanical and electrical components of an exemplary imitation candle device that includes a moving flame element. FIG. 2(B) provides a close-up view of some of the components of FIG. 2(A). For example, an imitation candle device can include an enclosure 210 that houses the internal candle components, and a flame element 202 that protrudes from top of the outside housing 210. Flame element 202 is suspended by a wire support structure 204 (e.g., a steel wire). The bottom section of the flame element 202 below the steel wire support structure 204 can include a magnetic element 218 that interacts with a magnetic field produced by an electromagnet or a coil 212. The coil 212 can be energized by control signals generated by electronic circuits that are located on, for example, a printed circuit board (PCB) (not shown in FIG. 2(A)) included within the body of the imitation candle device. The PCB, for example, can include filters, analog-to-digital circuits and/or a processor or controller (e.g., a microprocessor, a digital signal processor (DSP), an FPGA, an ASIC, etc.) that receive signals associated with an application program running on a user's mobile device or associated with a remote control device. The signals can be processed by the components of the PCB. The processor can execute program code stored on a non-transitory storage medium, such as ROM, a RAM or other memory device, to analyze the signals.

In some implementations, electronic circuits on the PCB can generate pulses that cause the electromagnet to turn on and off, to vary the produced magnetic field strength, or to reverse polarity, at particular time instances. In one example, the signals that energize the coil 212 is a pulse-width modulated signal. In other examples, such signals provide an amplitude modulated, a phase modulated or a frequency modulated signal to the coil 212. Due to interactions of the magnetic element 218 with the magnetic field of the coil 212, the flame element 302 can oscillate and produce a flickering effect when illuminated by the light produced by the one or more light sources 206. The light source 206, (e.g., an LED) can be placed inside an enclosure of the housing, as shown in FIG. 2(A). The light source 206 can, for example, project light of suitable color and/or intensity to the flame element 202. In some implementations, more than one light sources 206 is used to illuminate the flame element 202 from one side, and/or from both sides. In some embodiments, the light source 206 can be an incandescent light source, a plasma light source, a laser light source, or can include other suitable light producing mechanisms.

The imitation candle device can further include a wireless receiver component (e.g., detachable dongle 208) that receives and decodes wireless signals transmitted thereto. For example, some components of such a wireless receiver can facilitate in controlling one or more operative features of the imitation candle device based on one or more wireless technologies and protocols, such as infrared, Wi-fi, WiMax, Bluetooth or cellular protocols. Examples of such operative features can include: a power-on or power-off operation of the imitation candle device, an adjustment of a light intensity level of the flame element 202, a selection of a movement of the flame element 202, or a setting of a level of movement of the flame element 202. Using an application program running on a mobile device, a user can control remotely one or more operative features of the imitation candle device.

In some embodiments, an operative feature is an activation of a blow off feature of the imitation candle device in response to detection of an acoustic wave received via a microphone on the mobile user device. Thus, for example, if a user blows into a microphone on the user's cell phone or tablet device, this can cause the imitation candle device to be turned off. The application program converts the blow (e.g., an acoustic wave) into a digital signal and transmits the digital signal to the wireless transceiver included in the detachable dongle 208 for activation of the blow off feature of the imitation candle device, causing the imitation candle device to be turned off. In some embodiments, the application program differentiates between captured sounds of blowing air and other sounds such as clapping, musical tone, background noise, or human conversation. For example, if a user blows a sharp whiff of air into the microphone, upon detection of a blow by the application program, a corresponding wireless signal is sent by the application program to the wireless receiver (included in the imitation candle device) to turn off the imitation candle device.

In some embodiments, a flicker speed of the imitation candle device can be based on environmental factors such as a wind, a breeze, or a user moving his or her phone. That is, environmental factors can be used as criteria to determine the speed or pattern of flicker of the imitation candle device. Thus, if there is presence of environmental wind flow (or, ambient environmental wind) that fluctuates as a breeze, then the speed of such a breeze can cause the light source 208 to move according to a certain predetermined pattern. A microphone on the mobile device can pick up an acoustic wave corresponding to the breeze which can be received by the application program running on the user's mobile device. Upon receiving the acoustic wave, the application program determines the velocity of the breeze and transmit a corresponding signal to the detachable dongle 208. Upon receiving the signal corresponding to the breeze, the detachable dongle 208 can transmit an electrical signal to circuitry included on the PCB board of the imitation candle device. Upon receiving the electrical signal, the circuitry included on the PCB board modulates the flicker speed of the light source 208. In some implementations, the detachable dongle 208 acts as a relay and hence the electrical signal transmitted by the detachable dongle 208 is the signal corresponding to the breeze.

In some embodiments, when a user moves his or her phone manually, such movement can result in a breeze to be simulated or generated. For example, if a user moves his or her phone vertically up and down (or, sideways) that can cause a breeze to be generated, the speed of the breeze can be detected by the application program running on the mobile device, which can cause the application program to transmit a signal to the detachable dongle 208, resulting in flickering of the light source 208 according to a certain speed that corresponds to the speed of the breeze. It will be understood that disclosed embodiments do not limit the direction of movement and/or the speed of movement of the user's mobile device.

In some embodiments, the amount of flicker can be based on detection of a strength of a blow that is received by the microphone of the user device. For example, the flickering characteristics of the flame element can be altered to correspond to the strength or speed of the detected blow to simulate a real candle flame that is subject to a real blow. In this scenario, upon detection of a blow speed that exceeds a predetermined threshold value, the light source can be turned off to resemble a real candle flame that is extinguished in response to receiving a strong blow.

In some embodiments, a speed of the environmental breeze or wind is detected by a sensor, other than the microphone, located on the mobile device. This detection can be, in addition to, or in lieu of, the detection of the speed via the microphone on the user's mobile device. It will occur to one skilled in the art that mobile devices typically come equipped with all types of sensors (e.g., accelerometers). Such sensors can detect a velocity of movement of the user's mobile device.

In some embodiments, the flickering speed of the light source 208 can be automatically selected from one or more predetermined flickering speeds or flickering patterns. (The one or more predetermined speeds can be stored on a non-transitory storage medium, such as ROM, a RAM or other memory device coupled to circuitry included on the PCB board of the imitation candle device.) Thus, for example, if the environmental breeze falls in a first range of speeds, the light source 208 flickers according to a first speed or a first pattern. If the environmental breeze falls in a second range of speeds, the light source 208 flickers according to a second speed or pattern. Embodiments disclosed herein impose no limit on the numbers of such speed ranges. For example, an imitation candle device can have as many or as few ranges of speeds or flickering patterns. Further, there is no limit on the length of such speed ranges or the magnitudes of end values in each speed range. In some implementations, if the application program on the mobile device detects no movement (or, rather insignificant movement) of the mobile device, then the light source 208 does not move (or, rather barely moves). On the other hand, if the application program on the mobile device detects a high-wind breeze (such as in or near a sea beach) via a microphone and/or a sensor on the user's mobile device, then the imitation candle device can be extinguished.

In some embodiments, the flickering speed of the light source 208 is automatically calculated on-the-fly by the application program running on the mobile device. Thus, as the breeze is detected by the application program, the application program dynamically calculates in real-time (or, near real time), a corresponding flickering speed of the light source 208. Information pertaining to this dynamically calculated speed can be transmitted by a wireless signal sent by the application program to the detachable dongle 208. As a result, circuitry included on the PCB of the imitation candle device modulates the light source 208 and/or the movement of the flame element to flicker according to this dynamically calculated speed.

In some embodiments, in addition to the flicker speed of light source 208, the application program can select a color of the light source 208 depending on the speed of movement of the breeze. Thus, for example, if the environmental breeze falls in a first range of speeds, the light source 208 flickers with a first color. If the environmental breeze falls in a second range of speeds, the light source 208 flickers with a second color at a second speed. It should be noted that a desired flickering pattern can be generated by modulating one or more of the light intensity, light color, geometrical shape of the light projected on the flame element or movement of the flame element.

In some embodiments, the application can provide the functionality of altering the speed of flickering based on a selection by a user. For example, when the light source 208 is flickering at a certain speed based on detection of an environmental breeze, a user can change the flicker speed by increasing the flicker speed, decreasing the flicker speed, or turning off the flicker. In some embodiments, a user can set a timer such that the light source continues to flicker for a time duration set by the timer. In such scenarios, the application program suspends detection of the environmental breeze until the lapse of time duration.

In some embodiments, the speed of movement (or, lack thereof) is determined periodically according to a predetermined schedule, for example, every 10 milliseconds or every ten seconds. Further, in some embodiments, a user can select (using an interface of the disclosed application program), the periodic schedule (or, time interval) at which the speed of movement of the user's mobile device is to be determined by the application program. For example, if a mobile device is located in an area of high environmental wind fluctuations and the candle is in close proximity to the user, but the user does not desire the flicker speed of light source 208 to change very often, the user can set the time interval (e.g., over-riding the predetermined schedule) to a really high value (e.g., every 30 minutes). It will be understood that the interval of speed detection can be set for the microphone-based speed detection and the sensor-based detection mechanisms. In the descriptions herein, environmental wind flow or breeze is used as illustrative examples only. Therefore, it will be understood that an environmental wind or breeze need not be necessarily produced by the environment but can also include scenarios such as when a user is whistling air in a certain pattern into the microphone of the mobile device.

In some embodiments, the application program can identify a blow (e.g., for activation of a blow off feature) or a breeze (e.g., for activation of a flickering feature) based on voltage (or, current) values of a resultant electrical signal generated from conversion, sampling, and digitization of an acoustic wave into the electrical signal. It should be noted that, in the above description, the application program is provided as an example for controlling the functionalities and operative features of the imitation control device. It is, however, understood that in some implementations, controlling the functionalities and operative features of the imitation control device can be performed by software and/or hardware included in the imitation control device, in parallel to, or in unison with, the application program.

For example, in some embodiments, blow detection can be performed by blow detection circuitry included within the body of the imitation candle device. Such blow detection circuitry can be implemented as a separate component from other components of the PCB, or combined with other components of the PCB. In some embodiments, to facilitate the detection of a blow, a microphone is included within the body of the imitation candle device. The microphone can be coupled to an amplifier to generate an AC signal above a predetermined threshold voltage value (e.g., 200 mV), or a within a predetermined range of values (e.g., 200 mV to 3.5 V). Whereas the sound pressure/level due to a blow provides voltage values above such a threshold (or within such predetermined range of values), other sounds, such as a clapping sound, detected by the microphone can only generate an AC signal below the threshold value (e.g., at 20-100 mV), or outside of the predetermined range of values that correspond to the detection of the blow. The resulting signal of the amplifier can be further coupled to a second stage amplifier with a high amplification factor (e.g., 100 to 300 times). In some implementations, the second stage amplifier is a capacitive coupling transistor amplifier that forms a square wave that is provided to the processor to shut down the candle device. If the captured sound wave produces a signal below the threshold, such a signal does not activate the second stage amplifier (e.g., the transistor amplifier), and thus the appropriate signal for shutting down the candle device is not generated. It should be noted that, in the above description, voltage values are provided as examples to facilitate the understanding of the disclosed embodiments. It is, however, understood that other measurements, such as measured current values, may be used for identifying the blow, and/or different ranges of values may be used to effectuate the identification.

In some embodiments, the imitation candle device can detect an environmental breeze using circuitry included in the imitation candle device, the flicker speed of light source 208 can be modulated. For example, one or more components (e.g., a microphone) included in the blow detection circuitry included within the body of the imitation candle device can be used to detect an environmental breeze. Such detection can be, in lieu of or, in addition to the detection by the microphone or a sensor on the user's phone. Thus, in some embodiments, the application program does not necessarily need to be present for the environmental breeze-based flickering to occur.

It will be understood that the application program (designed in accordance with embodiments disclosed herein) can be offered for download by a manufacturer of the imitation candle device, or from a marketplace of application programs such as Apple's App™ Store™ or Google's Google™ Play™. In some scenarios, the application program can be offered by vendors or distributors of the imitation candle device. In some embodiments, the disclosed application program can facilitate operation of a group of imitation candle devices to be controlled in parallel. Thus, each imitation candle device in a group of imitation candle devices can include a detachable dongle that can receive a broadcast signal from the application program controlling the group of imitation candles. In some embodiments, the application program can allow a user to create "common" group-based settings that apply to each imitation candle device in the group. Such group-based settings can be power-on or power-off operations of each imitation candle device in the group, adjustment of a "common" light intensity level of each imitation candle device in a group, selection of a "common" movement of the flame element group-based settings, a setting of a level of movement of the flame element 202 and/or other common operations that are enabled by the application program. For example, group-based settings can also apply to activation of a blow-off feature, activation of a flickering feature based on environmental factors, a selection of a particular imitation candle device, a selection of a timer feature, a setting of a timer value, a selection of a light intensity or brightness level, or a selection of a group of imitation candle devices. In some implementations, the application program can allow a user to configure the settings of a particular imitation candle device in a group of imitation candle devices.

It should be noted the above description has been provided with reference to an imitation candle device with a moving flame element. It is, however, understood that in other imitation candle configurations, such as those that utilize non-magnetic means for moving the flame element, in candle devices with a stationary flame element, or any other imitation candle device that can accommodate a detachable dongle 208 and the associated circuitry, one or more of the above functionalities can be implemented. Moreover, in some applications, the disclosed technology may be implemented as part of an imitation fireplace, an imitation candelabra, or other lighting fixtures. Further, in some implementations, a device other than a microphone, such as flow sensor, can be used to detect a blow or a breeze.

Figure 3A:
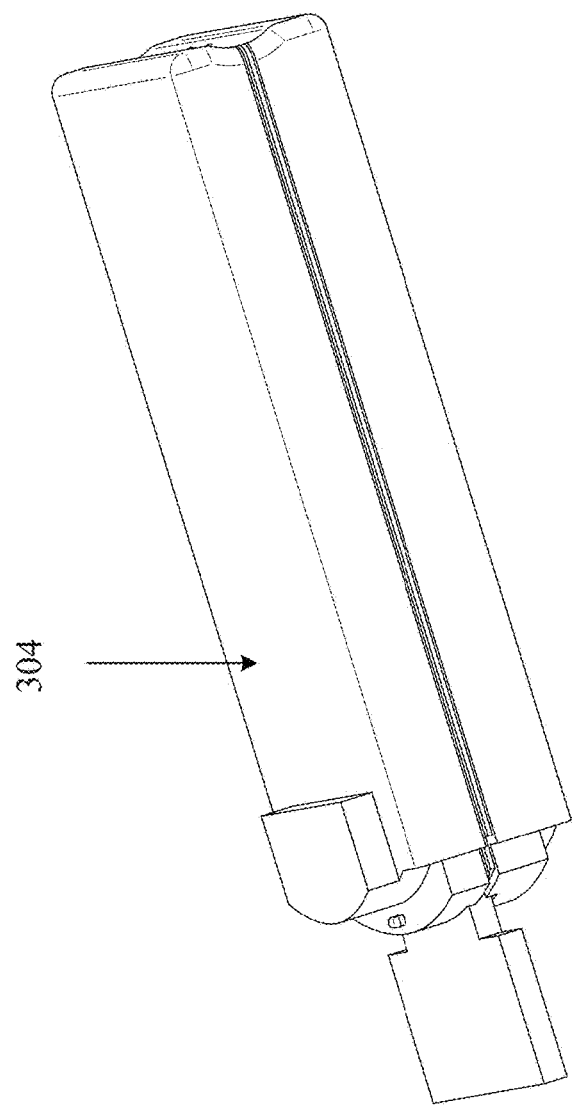
FIG. 3(A) is a picture of a removable wireless transceiver attachable to an imitation candle device.
Figure 3A:
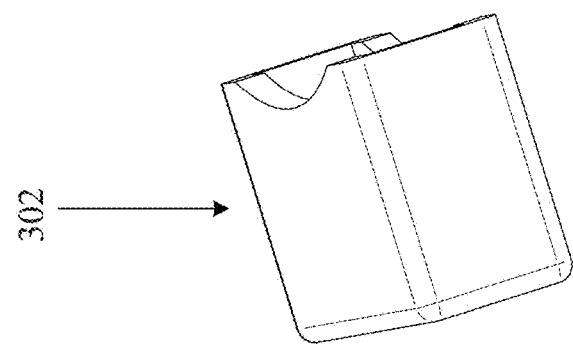

FIG. 3(A) is a picture of a removable wireless transceiver attachable to an imitation candle device in accordance with an exemplary embodiment. The removable wireless transceiver (alternatively a "dongle") includes a cover 302 that attaches to a body 304. The body 304 includes hardware and software components/modules that facilitate wireless communications (e.g., receiving wireless signals) between a mobile application (e.g., running on a user's mobile device) and the imitation candle device. Such a mobile application can configure, set, or control various operative features of the imitation candle device. Examples of such features can include an activation of a blow off feature of the imitation candle device in response to detection of an acoustic wave received via a microphone on the mobile user device, an activation of a flickering effect of the imitation candle device in response to detection of a speed of an ambient breeze, etc. Furthermore, in scenarios where the user does not wish to remotely operate the wireless transceiver using an mobile application, the wireless transceiver can be removed from the imitation candle, and the imitation can operate without the wireless transceiver module. In some embodiments, the wireless (e.g., Bluetooth) dongle can be interchangeably deployed in any of one of a plurality of imitation candle devices. For example, one wireless dongle can be purchased and used for enabling remote operation of a particular device. The wireless dongle can then be removed and interested into a different imitation candle device to enable remote operation of that device.

Figure 3B:
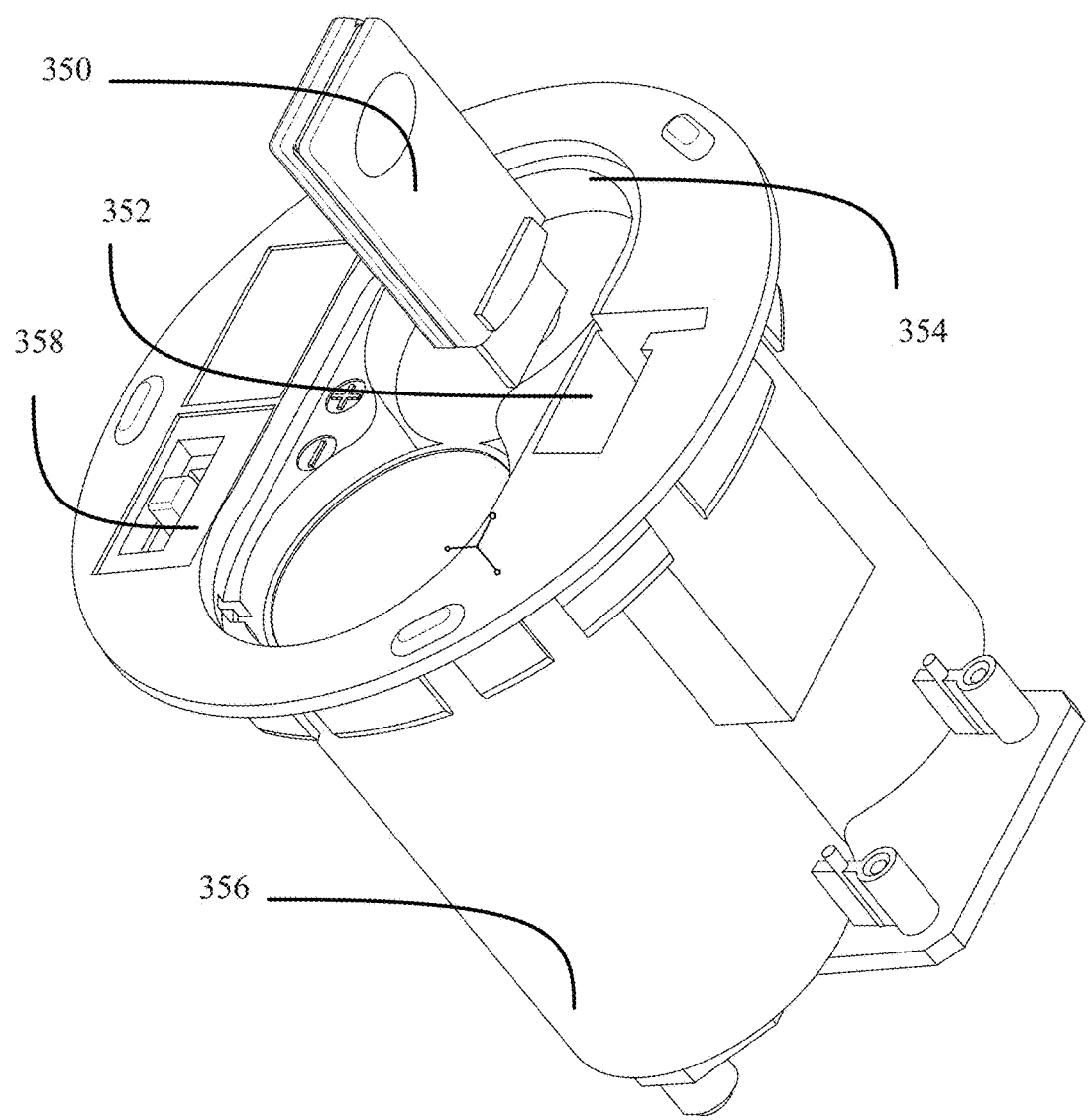
FIG. 3(B) illustrates a side view of a portion of an imitation candle device that receives a removable wireless transceiver of FIG. 3(A).

FIG. 3(B) illustrates a side view of a portion of an imitation candle device that receives a removable wireless transceiver 350 of FIG. 3(A). In some implementations, removable wireless transceiver 350 is received at a slot 352 on the base of an imitation candle device. Additionally, FIG. 3(B) shows that the base of the imitation candle device is attached to a body 356 of the imitation candle device. The base of the imitation candle can also include battery compartment 354, for example, for receiving two AA batteries or two CR2032 "coin-type" batteries that can power the imitation candle device. In some implementations, an imitation candle device can include a Timer On-Off switch for activating a timer included in the circuitry of the imitation candle device. With the timer in the ON position, an imitation candle device can be timed to stay on for a predetermined duration of time (e.g., 4 hours, 6 hours, etc.), where the predetermined duration of time can be set by a mobile application (e.g., running on a user's mobile device) wirelessly communicating with the imitation candle device via the removable wireless transceiver 350. Thus, wireless transceiver 350 can facilitate portability of operation by allowing the wireless transceiver 350 to be attached to more than one imitation candle, whenever desired by a user.

Figure 4:
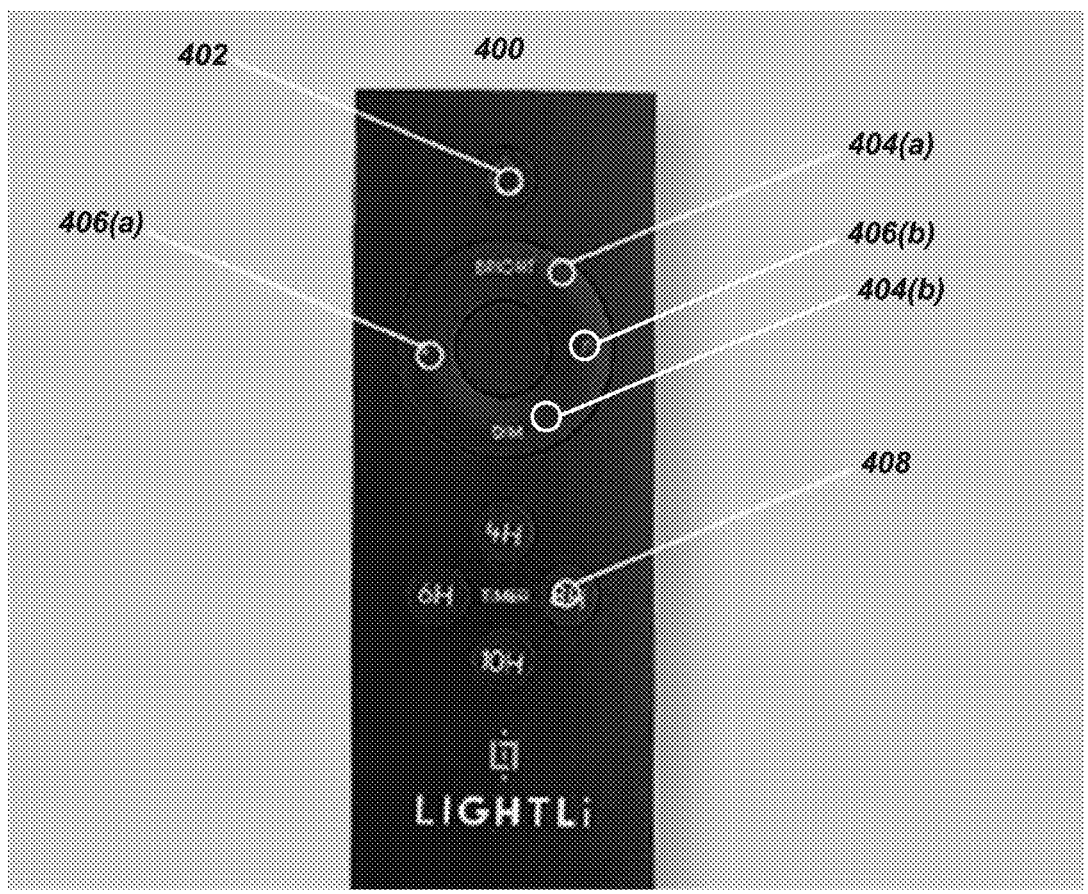
FIG. 4 illustrates an exemplary remote control device for controlling an imitation candle device.

As noted in connection with FIG. 1, the disclosed imitation candle devices may be equipped with an optional remote control device that enables control of various candle functionalities from a remote location. An exemplary remote control device 400 is shown in FIG. 4. Various buttons on the remote control device 400 enable a user to remotely control various features of one or more associated imitation candle devices. In particular, an on-off button 402 allows the imitation candle device to be turned on or off remotely. The brightness/dimness of the candle device is controlled by two switches, 404(a) and 404(b), that are positioned below the on-off button 402, and the speed of the flickering and/or movement of the candle's flame element is controlled via switches 406(a) and 406(b). The remote control device 400 further includes one or more timer buttons 408 (e.g., 4-stage timer buttons) that allow the imitation candle device to operate for any one of several timed durations (e.g., a 4-hour, a 6-hour, a 8-hour or a 10-hour duration) before the candle device is automatically turned off. To activate the timer operation, a user can, for example, press the central timer button followed by the desired duration button. The remote control device 400 can also include additional buttons (e.g., a candle selection button, a blow on-off activation button, a flicker speed change activation button, a wireless coupling button, etc.) to enable additional operations and communications with one or more imitation candle devices. (The flicker speed change activation via a remote control device 400 can be similar to the flicker speed change activation discussed earlier with respect to a mobile application program running on a user's mobile device. In such embodiments, the remote control device 400 can include a microphone or a sensor to detect environmental factors such as speed of a wind or a breeze.)

In some embodiments, remote control device 400 can be operated in combination with the mobile application wirelessly communicating with the imitation candle device via the removable wireless transceiver. In such embodiments, the communication protocols and frequencies used by the wireless transceiver can be different than the remote control device 400. Thus, for example, the remote control device can operate in an infra-red (IR) band whereas the wireless transceiver can be operated using a Bluetooth wireless protocol.

Figure 5A:
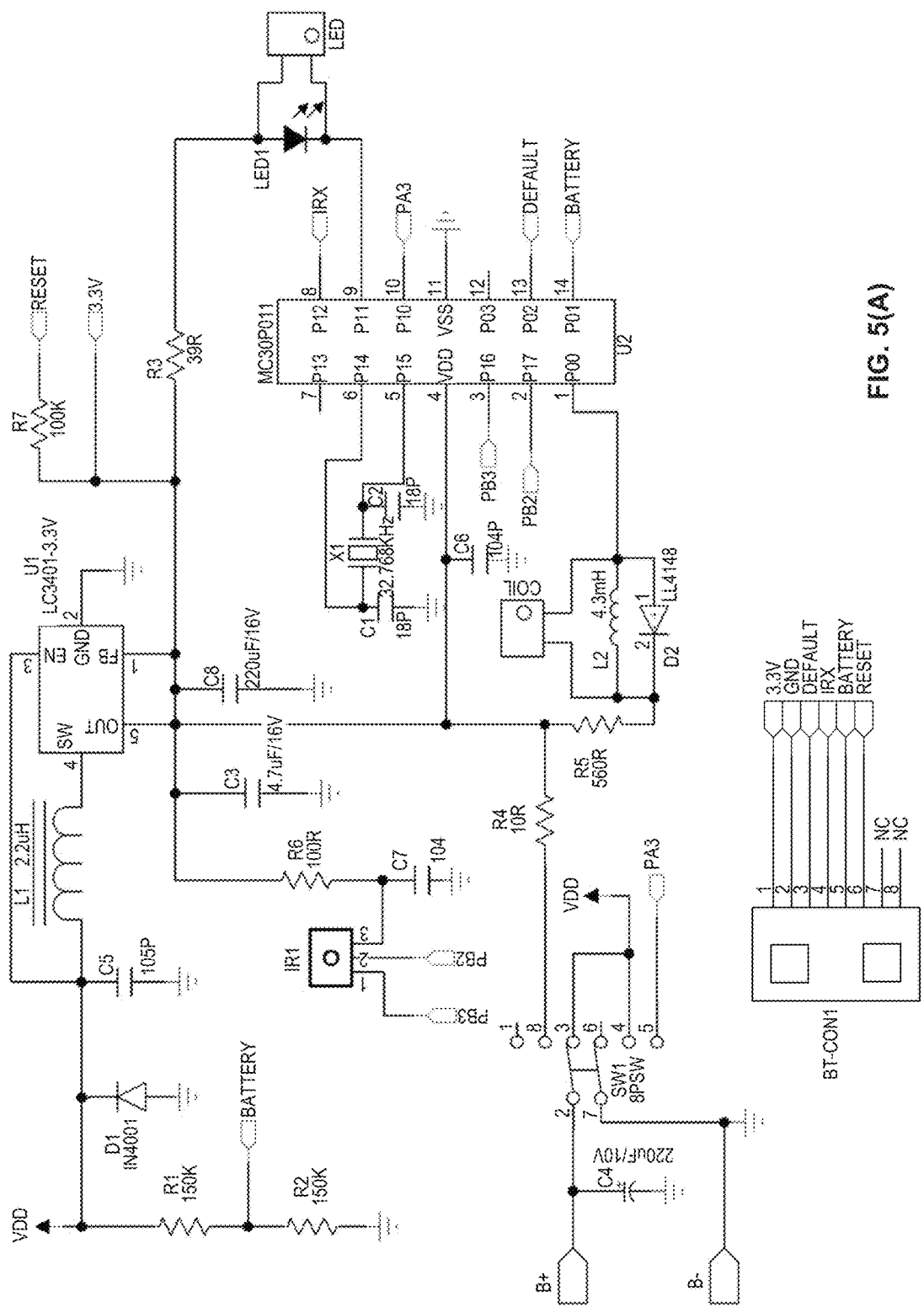
FIG. 5(A) illustrates an exemplary circuit diagram associated with an imitation candle device including circuitry for receiving a removable wireless transceiver of FIG. 3(A).

FIG. 5(A) illustrates an exemplary circuit diagram associated with the electrical components of the remote control device including electrical circuitry to communicate with the detachable Bluetooth dongle 110. The circuit is powered (at VDD) by a battery such as a CR2032 lithium button battery that supplies a voltage (e.g., in the range 2.2 to 3.3 V) to the chip U1 via a switch SW1. In one embodiment, the chip U1 can be a LC3401-3.3 V chip that outputs via pin 5 (OUT) a stable 3.3V voltage supply. This stable voltage supply is used to power the chip U2, the LED1, the coil L1, and the Bluetooth module (BT-CON). In some embodiments, the chip U2 can be a MC30P011 chip. In some implementations, the chips U1 and U2 include a microprocessor. It is, however, understood that the chips U1 and U2 may include, or be designed as, an FPGA, an ASIC, a DSP, or discrete circuit components. When the switch SW1 is an ON position, the chip U2 starts to receive the stable 3.3V voltage supply. Under this condition, if the pin 1 (PO1) of chip U2 is at a higher voltage level than 1.1V, then the control output P00 opens, thereby generating square wave to coil L1 to produce an oscillating magnetic field. The circuit also includes a magnet the lower portion of which produces a magnetic field which has the same direction as the magnetic field of the coil. Accordingly, the two magnetic fields repel each other producing a left-right swinging motion. The upper portion of the magnet produces a magnetic field having a direction that is opposite to the magnetic field produced by the lower portion of the magnet. The flame element is moved to perform a left-right swinging motion. At the same time, the chip U2 controls pin P11 to output a low voltage to turn on the LED, the light from which is projected on the flame element at 35 degree angle approximately.

When the switch is at "TIMER" and pin P10 chip U2 has a low voltage, U2 controls P00 to output a changing square wave to control coil L1 to produce a magnetic field. At the same time, pin P11 of chip U2 outputs a low voltage to turn on the LED. After an interval of 5 hours, U2 controls P00 to output a low voltage, to make the flame element stop swinging, and the LED turns off. After another 19 hours, the imitation candle device starts operation again. A single cycle takes 24 hours, and the cycle repeats itself until the battery is depleted or the switch SW1 is switched. The interval of time used in the discussions are for exemplary purposes only. Embodiments of the imitation candle device impose no limitation on the various time intervals involved in operation.

When the switch is in an "ON" position or "TIMER" position, and with the Bluetooth module plugged in, after the Bluetooth module detects that the battery voltage is above 1.5V, a low voltage is supplied to pin P02. The imitation candle's LED1 flashes twice, indicating that the Bluetooth module is ready. If the Bluetooth module detects that the battery voltage is below 2.0V, then the Bluetooth module sends a notification to the application program on the user's mobile device. The application program presents a low voltage alert to the user. In some embodiments, when the voltage is low, the remote control, one or more functionalities of the Bluetooth module is turned off, however, the application program can control the operations of the imitation candle device.

Figure 5B:
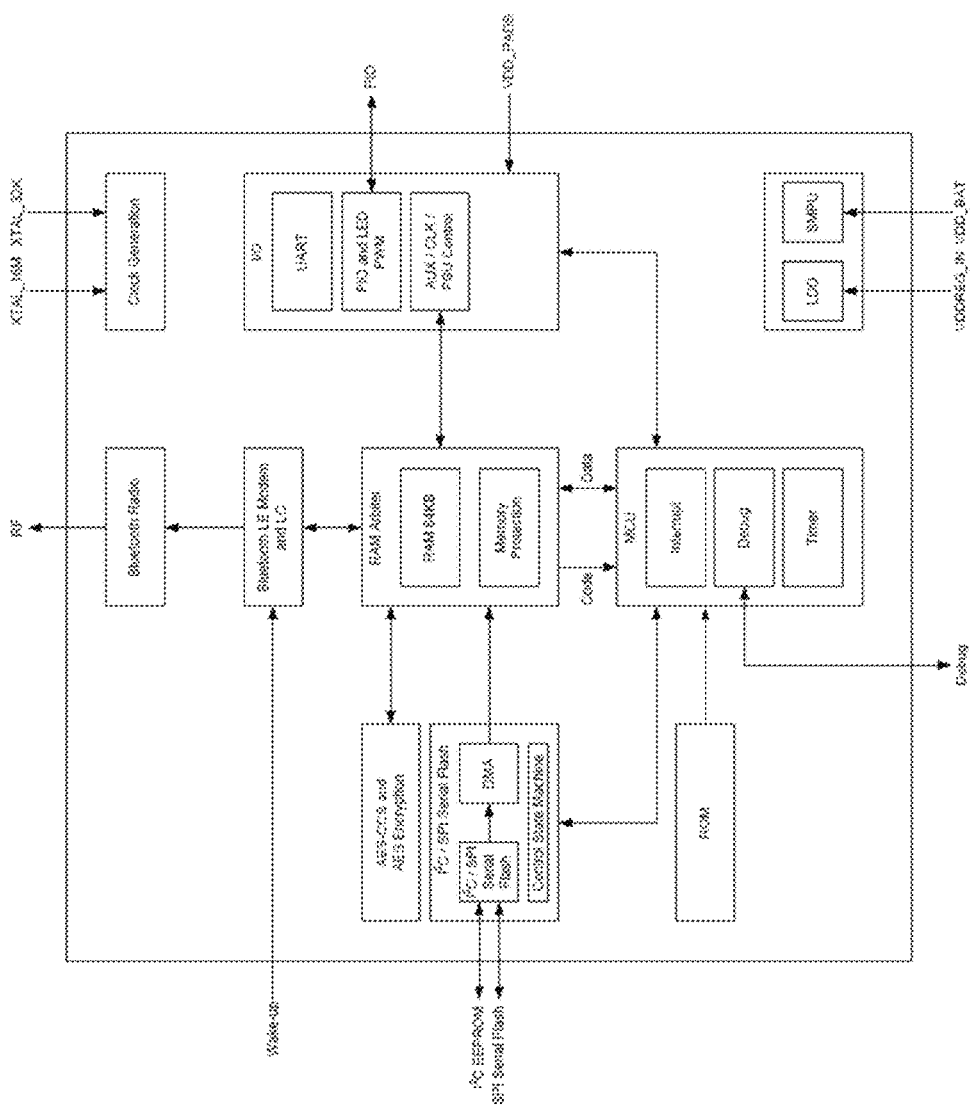
FIG. 5(B) illustrates electronic circuitry included within the removable wireless transceiver of FIG. 3(A).

FIG. 5(B) illustrates electronic circuitry and components included within a removable wireless transceiver, such as the one shown in FIG. 3(A). In FIG. 5(B), a removable wireless transceiver includes a Bluetooth radio module, a Bluetooth Low Energy (LE) modem module, a RAM Arbiter module, a MCU module, a ROM module, an encryption module, a serial flash module, a clock generation module, an input/output (I/O) module, an LDO module and a SMPU module. One or more of these modules can further include additional components and modules. For example, the RAM arbiter module can include a 64 KB RAM and a memory protection module. FIG. 5(B) also indicates various control signals used in communications between these components. For example, a Wake-up signal sent to the Bluetooth Low Energy (LE) modem wakes up the modem from a "sleep" stage. This prevents unnecessary consumption of battery power when the imitation candle device is not in use. Thus, it is evident that embodiments of the present disclosure enable low-power connectivity and basic data transfer for applications that are limited by constraints such as battery life, size or form-factor constraints, and computational requirements imposed by wireless standards. Operations and functionalities of one or more of the modules included in the electronic circuitry and components of a removable wireless transceiver will be understood and appreciated by one of ordinary skill in the art. In some embodiments, one or more of these modules can be off-market components manufactured and/or distributed by different vendors. For example, the Bluetooth Low Energy (LE) modem module can be a LW5188 module offered for sale by Qualcomm Inc.™

Figure 6A:
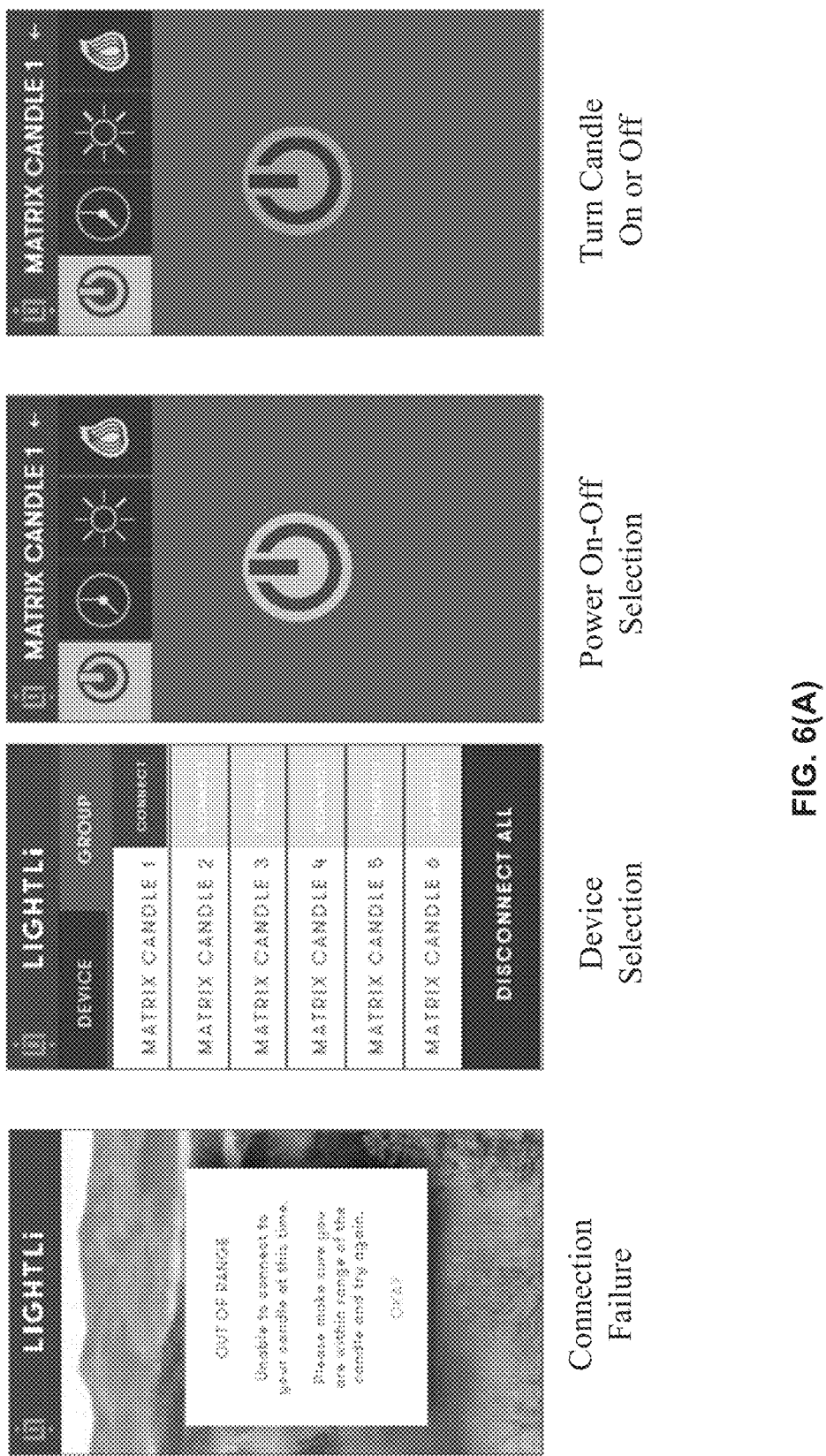
FIG. 6(A) is a series of exemplary user interface screens associated with an application for controlling the operations of an imitation candle device.

FIGS. 6(A) to 6(D) provide exemplary user interface screens of one exemplary application that facilitates remote control of different operative features of the imitation candle device to be controlled in a user-friendly manner on a graphical user interface (GUI), and further facilitates the addition of new features and/or improvements via software updates. It will be further appreciated that the application running on the electronic device of the user communicates wirelessly using Bluetooth, Wifi, or cellular protocols with a wireless transceiver (e.g., a Bluetooth dongle) attachable to the imitation candle device. For example, as shown in FIG. 6(A), the application can determine as to whether or not a particular imitation candle device is within the range of communication, and provides an indication if the application is unable to establish a link with one or more candles. The application further enables a user to select a particular candle device among a plurality of candle devices, as shown in FIG. 6(A)'s selection of Matrix Candle 1. As further shown in FIG. 6(A), once a particular candle device is selected, the user interface allows the selected candle to be turned on or off by selecting the on-off button, and activating the button as needed.

Figure 6B:
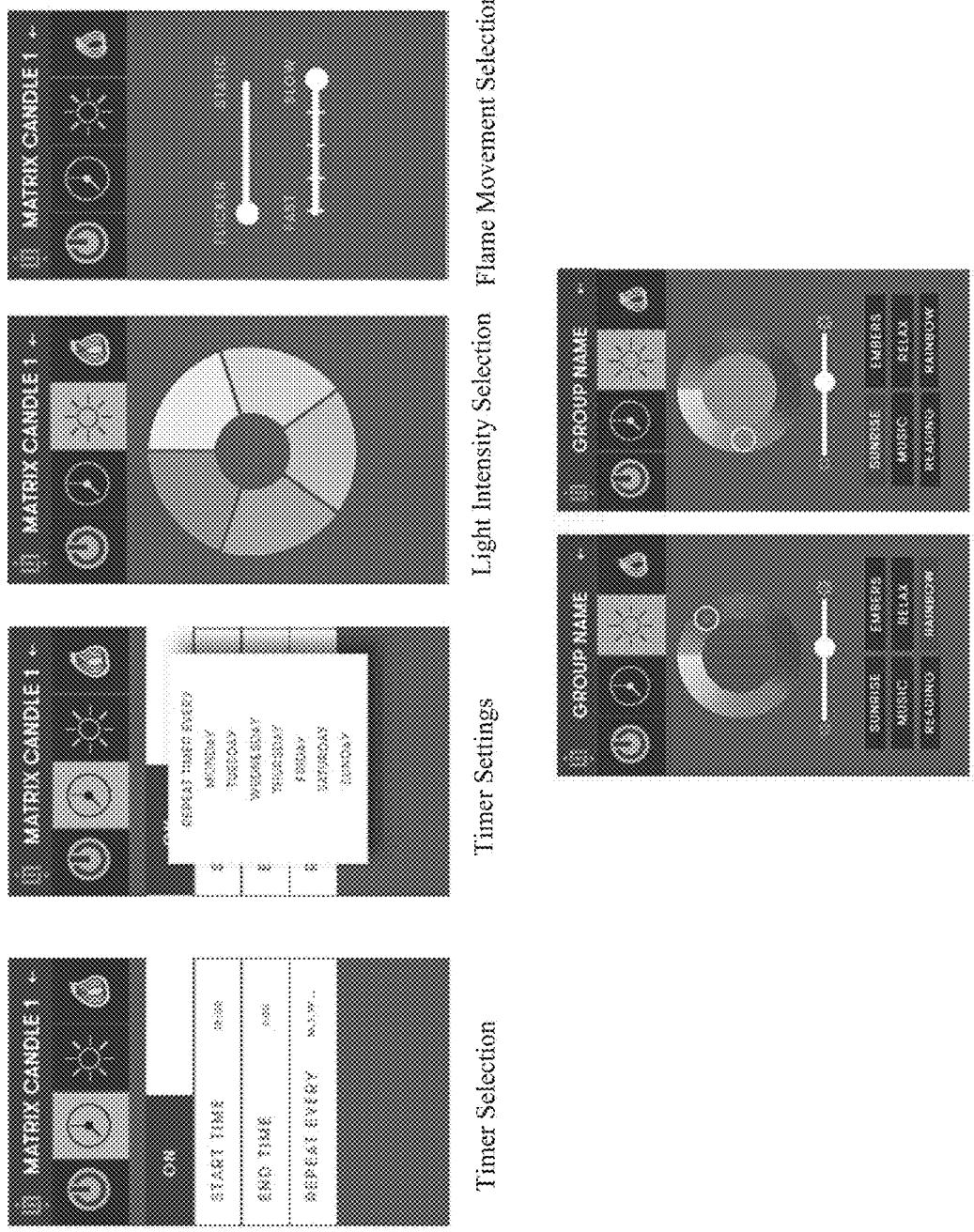
FIG. 6(B) is a series of exemplary user interface screens associated with an application for setting a timer and controlling illumination properties of an imitation candle device.

FIG. 6(B) illustrates activation of additional functionalities through the user interface. In particular, in the exemplary user interface screen in FIG. 6(B), the timer selection option allows setting of a start time, an end time and repetition period. The timer setting can further be customized to activate the desired feature on particular days of the week (e.g., by clicking on or highlighting the particular day(s) of interest on the menu of the user interface). A user can select to increase intensity or dim (decrease intensity) as he or she desires. The application further allows the selection of an appropriate candle light intensity by, for example, clicking on one of the segments of the depicted light wheel. Such a selection allows adjustment of light intensity or brightness of the light that illuminates the flame element in order to, for example, accommodate different moods and/or different ambient lighting conditions.

As shown in FIG. 6(B), a user can also select a particular color of the light that illuminates the flame element. In one exemplary embodiment, the user interface includes a color wheel that presents a range of colors to the user, and allows the user to select a particular color. In the exemplary user interface of FIG. 6(B), color selection can be carried out by clicking (or touching) a section of the color wheel and dragging the mouse (or finger) around the wheel to a desired location to select a particular color. The selected color is also presented in the center portion of the wheel, allowing the user to assess whether the selected color is acceptable. As shown in FIG. 6(B), the color intensity or brightness of the color can also be changed via a control component such as the depicted slider below the color wheel. The user interface can also include a plurality of pre-set fields that allow a user to select a particular pre-set option that, for example, reflects a particular mood or environment. For instance, such pre-set options can include a sunrise, a music, an embers, a relax, a reading or a rainbow option as depicted in FIG. 6(B). In one example, selection of a "sunrise" pre-set option would cause the flame color to resemble the color of the sky at sunrise.

The movement of the flame element can also be controlled via the application, by, for example, selecting an amount of flicker on a sliding bar that ranges from full flicker to an appearance of a static flame. Additional control features (e.g., via a second sliding bar) may also be provided to control the speed of flickering. Upon selection of the appropriate level of light intensity, color and/or flame movement, the appropriate control signals are generated at the application and transmitted to the removable wireless transceiver included in the imitation candle device. Upon reception of such control signals, the imitation candle device adjusts or activates/deactivates the selected features. In some implementations, a single control mechanism (e.g., a single item on the user interface) is provided to allow selection of a particular flickering effect or flickering amount. Such flickering effect may then be produced, in response to such selection, based on changes in one or a combination of properties of the light (e.g., intensity, color, location of illumination on the flame element, color, etc.) or the movement of a movable flame element.

Figure 6C:
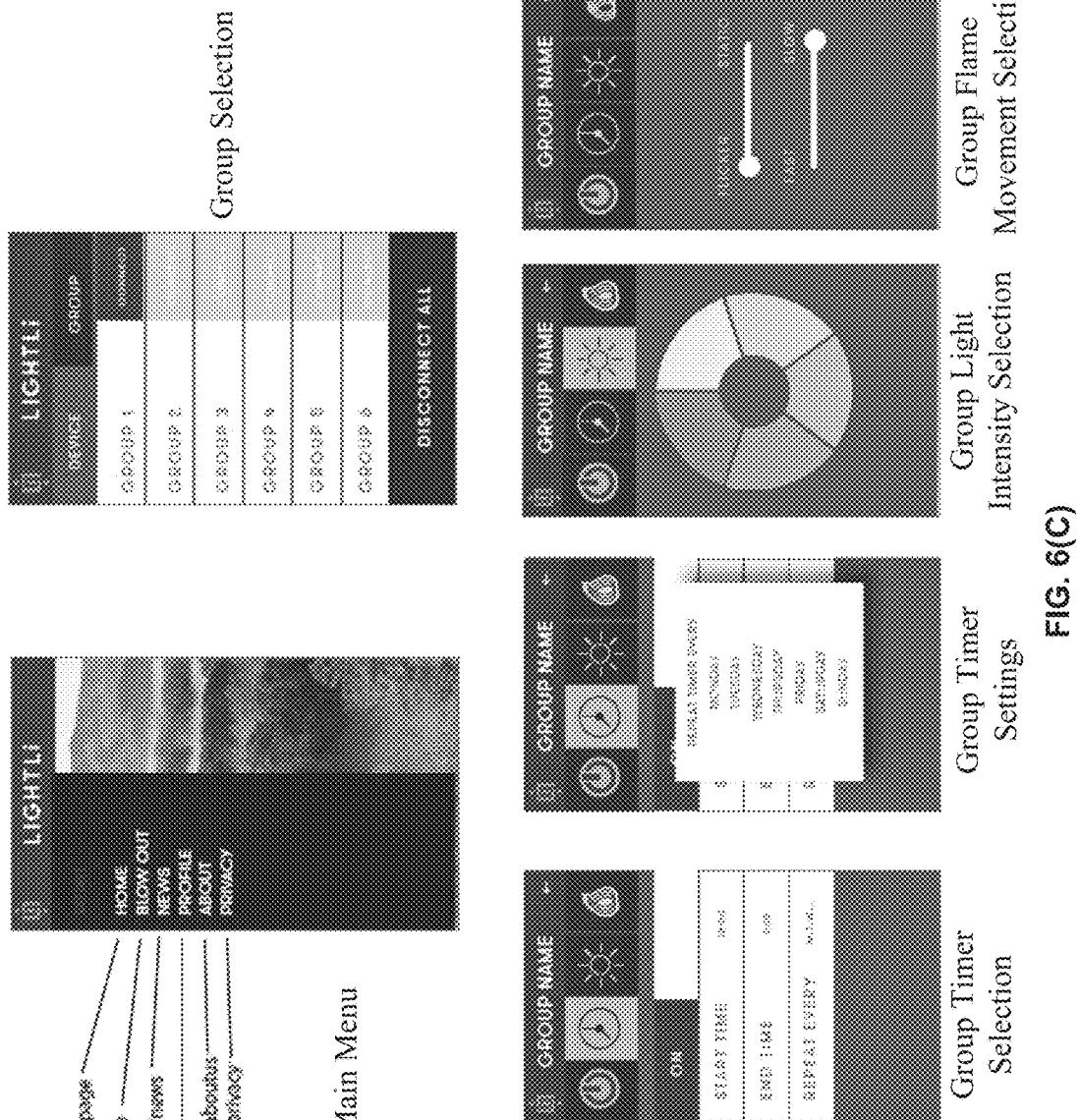
FIG. 6(C) is a series of exemplary user interface screens associated with an application for controlling the operations of a group of imitation candle devices.
Figure 6D:
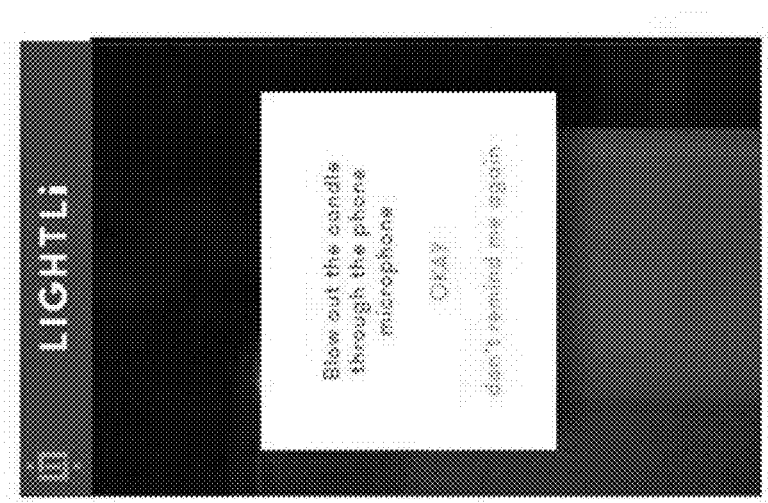
FIG. 6(D) is an exemplary user interface screen associated with an application related to a blow out feature of an imitation candle device.

FIG. 6(C) illustrates additional exemplary operations and selection capabilities of the remote control application. For example, selection of an item on the Main Menu (e.g., Home, Blow Out, news, Profile, About and Privacy) allows the user to navigate through the corresponding menu item. One feature of the disclosed application enables the selection of a group of candle devices. Such a group can, for example, be formed by selecting individual candle devices to be part of the group, and assigning a group name (e.g., by typing a desired group name). Once a group is formed, various functionalities of the candle devices within the group can be activated and/or adjusted. For example, as shown in FIG. 6(C), group timer selection, group time settings, group light intensity selection and group flame movement selection can be made in a similar manner as described in connection with an individual candle device. Additionally, if desired, a single disconnect button on the user interface can sever communications with all devices within the group or groups.

The blow on-off functionality can also be activated via the user interface by selection the Blow Out item on the main menu (see FIG. 6(C)). Once the blow out functionality on the remoted device is activated, the application can provide a notification to the user (see FIG. 6(D)) that the candle device can be turned off by blowing into the microphone of the electronic device (e.g., a mobile phone). The candle application receives the signals that are produced by the device's microphone, and upon detection of the blow, generates an appropriate signal for transmission to the removable wireless transceiver included in the candle device. The candle device, upon receiving the signal from the application, turns the candle off. In some implementations, the blow is detected by processing the intensity and/or pattern of data that is received from the microphone to distinguish and prevent ambient or unwanted sounds from inadvertently generating a blow off signal. Such a processing can, for example, include correlation and pattern recognition operations that produce a match only when a pattern and/or intensity of a blow is detected. In some implementations, the detection of the blow is carried out cooperatively between the application running on the user's mobile device and the imitation candle device. In some embodiments, the detected blow can be used to provide a control signal to vary the speed of flickering of the light sources, and/or change the speed of movement of a moving flame element (in candles that include such a moving flame element). As such, the control signal enables the simulation of a candle flame that shakes or moves in correspondence with the strength of the detected blow. Thus, for example, if a strong blow is detected (albeit below a level that causes the candle to be fully blown out), the light and/or the associated movement of flame can be more pronounced or faster; if no, or little, wind is detected, then the flickering of the lights and/or movement of the flame element is adjusted very little to resemble a flame that is subject to little or no wind.

Figure 6E:
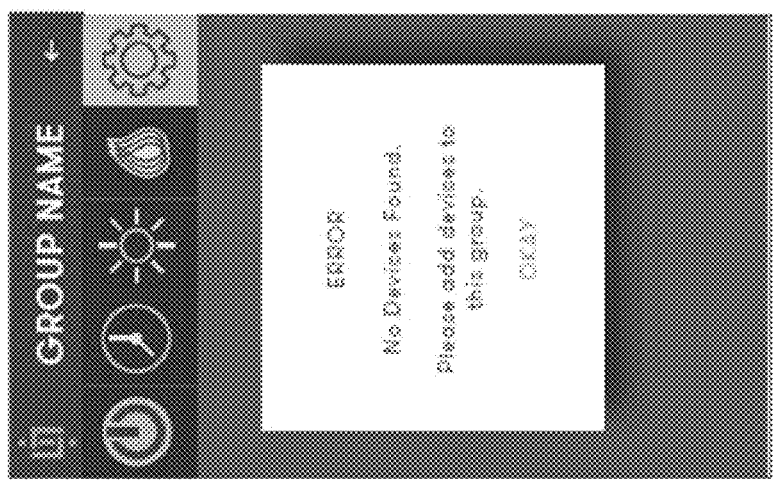
FIG. 6(E) is an exemplary user interface screen associated with an application that includes a utility or settings feature of an imitation candle device.
Figure 6E:
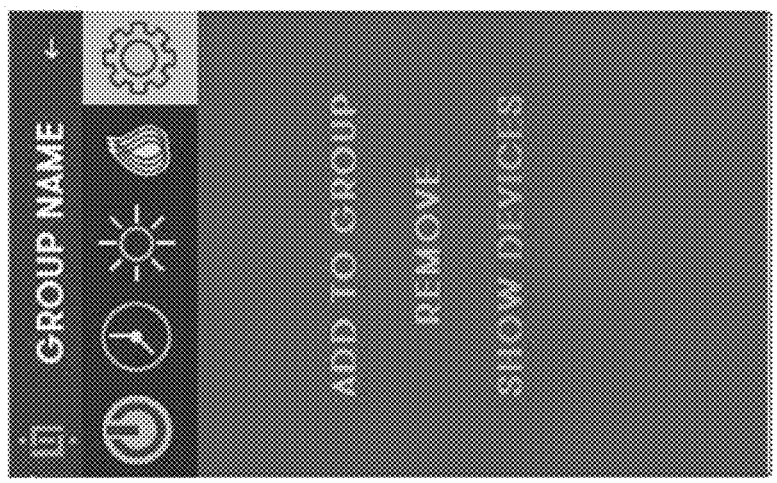

In some embodiments, the user interface of the application can include additional buttons or menu options. For example, as shown in FIG. 6(E), the user interface can include a utility or settings feature that is shown as a gear icon. This features can, for example, allow the user to add a group, remove a group or a candle, and to show the devices that can communicate with the application. As another example, the application can include a flicker speed change activation button. As discussed earlier, in some embodiments, the flicker speed of an imitation candle device can be based on environmental factors such as a wind, a breeze, or a user moving his or her phone. Such environmental factors can be used as criteria (e.g., by the application program) to determine the speed or pattern of flicker of the imitation candle device. Thus, when the flicker speed change activation button is selected or ON, and if there is environmental wind flow (or, ambient environmental wind) that fluctuates as a breeze, then the speed of such a breeze can cause the light source in the imitation candle device to move according to a certain predetermined pattern. In some embodiments, the user interface of the application can include an additional buttons (e.g., an up and a down button) to make the flame flicker speed faster or slower.

In some embodiments, aspects of the present disclosure facilitates voice-based control of the imitation candle device. Thus, various operative features of the imitation candle device can be controlled remotely when a user speaks into the microphone of the user's mobile device. For example, if the user speaks "off (on)" or "turn off (on)" the application program receives the word, recognizes the word, and sends a wireless signal to the removable wireless transceiver to turn off (on) the imitation candle device. Similarly, if a user speaks "blue color on," the flame element turns blue. The above-mentioned word-based control of an imitation candle device are for illustrative purposes only. Various other operative features of the imitation candle device can be activated by voice-based control. Accordingly, a user interface of the application can include a button that turns on the voice-based control functionality so that a user can control an imitation control by speaking into a microphone on the user's mobile device. Further, the application program can provide functionalities for recognizing a voice-based command (e.g., one or more words) and converting the voice-based command into a wireless signal for transmission to the removable wireless transceiver.

In some embodiments, the imitation candle device includes a speaker that is coupled to the electronic circuits on the candle's PCB and to the removable wireless transceiver (e.g., the Bluetooth dongle). In such embodiments, the imitation candle is configured to play music based on signals received from the software application that resides on the remote user device; such a signals are first received by the removable wireless transceiver, are decoded/demodulated, and then provided to the speaker. For example, with reference to FIG. 6(B), a user can select a pre-set option by selection "music" that enables wireless transmission of the music signal to the imitation candle device. The music can be pre-selected (e.g., associated with a particular mood or music genre), or can be selected by the user. For example, the user can stream live music from the Internet, or select a particular music file or file(s) for playback. This feature further enhances the user experience and complements the visual experiences of the user with the appropriate aural experience.

Figure 7:
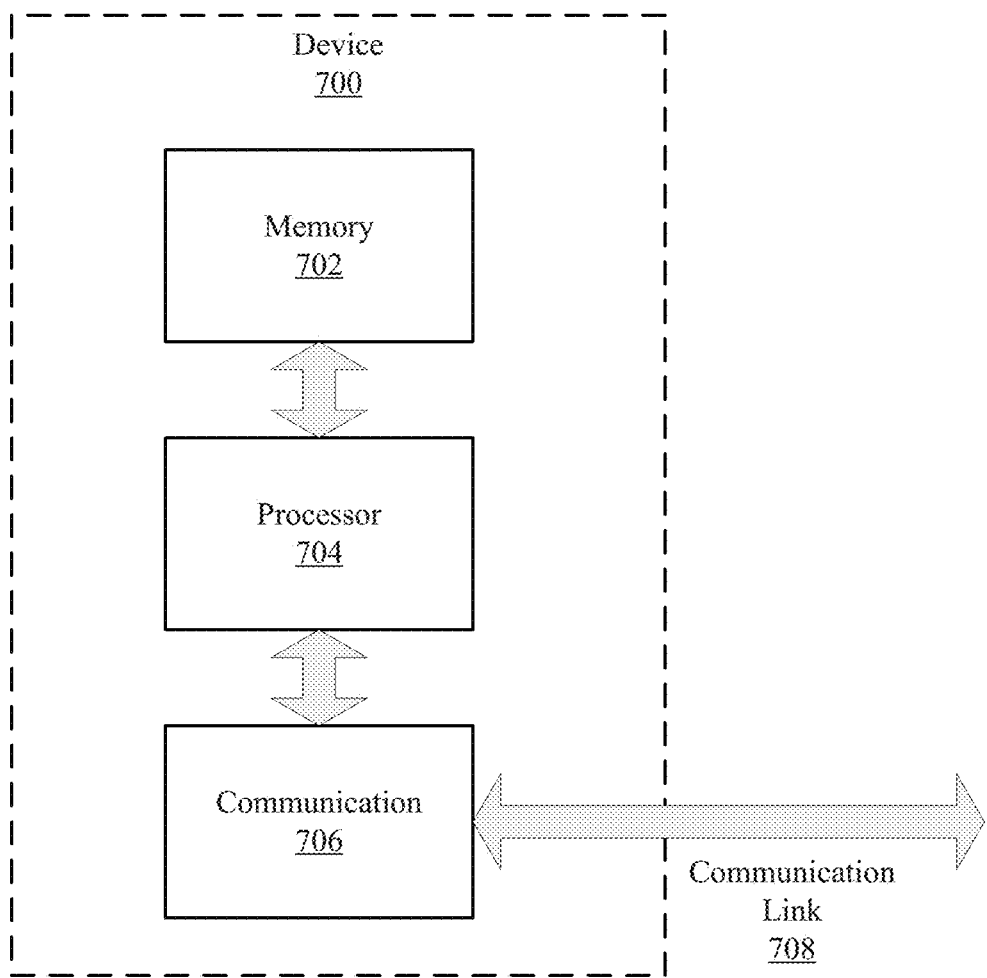
FIG. 7 is a block diagram of electronic components of a device that can be used to accommodate some of the disclosed embodiments.

FIG. 7 illustrates a block diagram of a device 700 within which some of the disclosed embodiments may be implemented. For example, the device 700 can be part of the user mobile device that includes the remote software application. The device 700 comprises at least one processor 702 and/or controller, at least one memory 704 unit that is in communication with the processor 702, and at least one communication unit 706 that enables the exchange of data and information, directly or indirectly, through the communication link 708 with other entities, devices and networks. The communication unit 706 may provide wired and/or wireless communication capabilities in accordance with one or more communication protocols, and therefore it may comprise the proper transmitter/receiver (transceiver) antennas, circuitry and ports, as well as the encoding/decoding capabilities that may be necessary for proper transmission and/or reception of data and other information.

For example, the device 700 can facilitate implementation of an imitation candle system. Such a system includes an imitation candle device and a portable electronic device wirelessly coupled to the imitation candle device. The imitation candle device includes a body, a flame element protruding from top of the body, one or more light sources positioned to illuminate the flame element to produce an appearance of a true fire flame, and electronic circuitry to control at least an output of the one or more light sources. The electronic circuitry also includes a wireless receiver to receive wireless signals. The portable electronic device includes a display, a wireless transceiver, a processor, and a memory including processor executable code. The processor executable code, when executed by the processor, configures the portable electronic device to present a graphical user interface on the display. The graphical user display includes buttons or fields that allow activation of a blow off feature of the imitation candle device to present a user interface that allows selection of a plurality of candle functions and features, including activation one or more of the following operations of the imitation candle device: a power-on or power-off operation, a selection of a particular imitation candle device, a selection of a timer feature, a setting of a timer value, a selection of a light intensity level, an adjustment of a light intensity level, a selection of a movement of the flame element, a setting of a level of movement of the flame element, or a selection of a group of imitation candle devices.

In one aspect of the disclosed embodiments relates to an imitation candle system comprising an imitation candle device that includes a removable wireless transceiver attachable to the imitation candle device and configured to communicate wirelessly with a mobile user device for controlling one or more operative features of the imitation candle device to produce an appearance of a true fire flame. The imitation candle system also includes a memory including a non-transitory computer-readable medium with processor-executable instructions included within the mobile user device that configure the mobile user device to communicate wirelessly with the wireless transceiver to modulate one or more parameters of a light source included in the imitation candle device based on a pattern that corresponds to a speed of movement of a breeze provided by a sensor on the mobile user device.

In one example, the sensor includes at least one of: a microphone on the mobile user device or an accelerometer coupled to the mobile user device. In another example, the one or more parameters include a flicker speed of the light source calculated in real-time and based on the speed of movement of the breeze. In yet another example, wherein the one or more parameters of the light source include a flicker speed and a flicker color that are set to: (a) a first predetermined flicker speed and a first predetermined flicker color upon the speed of movement of the breeze falling within a first range of speeds; and (b) a second predetermined flicker speed and a second predetermined flicker color upon the speed of movement of the breeze falling within a second range of speeds, wherein the first range of speeds is different from the second range of speeds, the first predetermined flicker speed is different from the second predetermined flicker speed, and the first predetermined flicker color is different from the second predetermined flicker color.

In one example, the one or more parameters of the light source include a flicker speed that is set to a zero value or a near zero value, upon the speed of movement of the breeze being zero or a near zero value. In another exemplary embodiment, the memory including the non-transitory computer-readable medium with processor-executable instructions included within the mobile user device configure the mobile user device to: in response to detection of an acoustic wave received via a microphone on the mobile user device, convert the acoustic wave to a digital signal, and transmit the digital signal to the removable wireless transceiver for activation of a blow off feature of the imitation candle device, thereby turning off the imitation candle device. In yet another exemplary embodiment, the breeze is generated due to one or more of the following factors: a movement of the mobile user device, a wind blowing in close proximity to the mobile user device, or a user blowing air into a microphone of the mobile user device.

According to another example embodiment, the speed of movement of the breeze is calculated according to a predetermined schedule. For example, the predetermined schedule can be a first predetermined schedule, wherein the memory including the non-transitory computer-readable medium with processor-executable instructions included within the mobile user device further configure the mobile user device to: upon detecting a request to over-ride the first predetermined schedule, receive a user selection of a second schedule; and set the second schedule for calculating a speed of movement of the breeze.

In another exemplary embodiments, the imitation candle device includes a movable flame element, and the memory including the non-transitory computer-readable medium with processor-executable instructions included within the mobile user device further configure the mobile user device to communicate wirelessly with the wireless transceiver to modulate a physical movement of the flame element of the imitation candle device. In one exemplary embodiment, the imitation candle device includes a coil configured to generate a magnetic field that interacts with a magnetic component of the movable flame element, and the memory including the non-transitory computer-readable medium with processor-executable instructions included within the mobile user device further configure the mobile user device to communicate wirelessly with the wireless transceiver to modulate the magnetic field generated by the coil, thereby inducing a movement of the movable flame element in accordance with the speed of movement of the breeze.

Another aspect of the disclosed embodiments relates to an apparatus included within an imitation candle device, comprising a removable wireless transceiver attached to the imitation candle device configured to wirelessly receive a plurality of control signals from a mobile user device, and electronic circuitry configured to modulate one or both of: a light produced by a light source within the imitation candle device or a movement of a flame element of the imitation candle device based on corresponding control signals received from the mobile user device, wherein modulation of the light produced by the light source or the movement of the flame element is carried out based on information obtained from the control signals indicative of a selection of a particular flickering effect or flickering amount.

In one exemplary embodiment, the removable wireless transceiver attached to the imitation candle device is configured to send a wireless signal indicating a low battery level to the mobile user device, in response to the removable wireless transceiver detecting that a voltage of a battery powering the imitation control device is less than a threshold voltage. In another exemplary embodiment, the removable wireless transceiver attached to the imitation candle device is configured to receive a signal indicating selection of the imitation candle device from a group of imitation candle devices, wherein the selection of the imitation candle device from the group of imitation candle devices is received from the mobile user device.

In yet another exemplary embodiment, the plurality of control signals includes a first control signal including information identifying a pattern associated with a speed of movement of a breeze blowing in close proximity to the mobile user device. In one exemplary embodiment, the plurality of control signals include a second control signal including information to activate a blow off feature of the imitation candle device, wherein the second control signal includes information corresponding to an acoustic wave detected via a microphone on the mobile user device.

Another aspect of the disclosed embodiments relates to an imitation candle system, comprising a first removable wireless transceiver attached to a first imitation candle device configured to communicate wirelessly with a mobile user device, and a first electronic circuit board including electronic circuits coupled to a first light source and configured to control the first light source for illuminating a first flame element of the first imitation candle device, wherein the electronic circuits are configured to: receive a first electrical signal from the first removable wireless transceiver, wherein the first electrical signal includes information for modulating a flicker of the first flame element; and receive a second electrical signal, wherein the second electrical signal includes information for activating a blow-off feature of the second imitation candle device received from the mobile user device.

In one exemplary embodiment, modulating the flicker of the first flame element includes modulating one or more of: a flicker speed, a flicker color, and a flicker duration of the first flame element. In another exemplary embodiment, the flicker of the first flame element is controlled according to a speed of movement of a breeze captured by the mobile user device. In yet another exemplary embodiment, upon detection of the speed of movement of a breeze that exceeds a predetermined threshold value, the first light source is turned off. In still another exemplary embodiment, the first wireless transceiver is configured to receive a timer setting signal from the mobile user device indicative of a predetermined schedule of an operation of the first imitation candle device.

In another exemplary embodiment, the above imitation candle system further includes a second imitation candle device that includes: a second removable wireless transceiver coupled to the second imitation candle device configured to communicate wirelessly with the mobile user device; and a second electronic circuit board including electronic circuits coupled to a second light source and configured to control the second light source for illuminating a second flame element of the second imitation candle device. The electronic circuits of the second electronic circuit board are configured to: receive an electrical signal from the second removable wireless transceiver that includes information for modulating a flicker of the second flame element; and receive another electrical signal that includes information for activating a blow-off feature of the second imitation candle device received from the mobile user device.

In another exemplary embodiment, the first removable wireless transceiver and the second removable wireless transceiver are interchangeably operable with the first imitation candle device or the second imitation candle device. In yet another exemplary embodiment, the first removable wireless transceiver and the second removable wireless transceiver are each configured to receive a signal from the mobile user device that includes information related to controlling a particular operation in a group of commonly-controlled imitation candle devices.

Another aspect of the disclosed embodiment relates to a computer program product embodied on a non-transitory computer readable medium. The computer program product includes program code for presenting a user interface that includes one or more user-selectable controls for remotely controlling an imitation candle device or a group of imitation candle devices, wherein the one or more user-selectable controls include: a candle group or a candle device selection control, an on-off control, a timer control, and a flicker control. The computer program product further includes program code for, upon receiving an indication of a selection of the one or more user-selectable controls, processing the indication to identify the one or more selected controls and to obtain information associated with the one or more selected control, as well as program code for generating a sequence of data symbols to be provided to a wireless transmitter that is configured to communicate with a selected candle device or a selected group of candle devices.

In one exemplary embodiment, the one or more user-selectable controls include a blow out control, and the computer program product further includes program code for, upon receiving an indication of a selection of the blow out control for a particular selected candle device or a particular selected group of candle devices, processing signals received from a microphone to determine a sound level or pressure captured by the microphone, and program code for generating a flicker modulation signal based on the determined sound level or pressure. The computer program product also includes program code for generating the sequence of data symbols that include information corresponding to the flicker modulation signal for the a particular selected candle device or a particular selected group of candle devices.

In another exemplary embodiment, the timer control presented on the user interface includes: a user-selectable timer on-off field that allows operation of an associated candle or group of candles to be limited within a particular time period, a user-settable time of day selection field that allows selection of time period within a 24-hour period, and a user-settable day of week field that allows selection of one or more days in a week. In yet another exemplary embodiment, the flicker control presented on the user interface includes a user-selectable light intensity selection field that allows selection of one of a plurality of light intensity level for an associated candle or group of candles. In still another exemplary embodiment, the flicker control presented on the user interface includes a user-selectable flame movement selection that allows selection of one of a plurality of movement patterns for an associated candle or group of candles.

In another exemplary embodiment, the plurality of movement patterns include a static pattern, a flicker pattern, or a particular speed of movement. In one exemplary embodiment, the one or more user-selectable controls presented on the user interface include a color control field that allows selection of particular flame color for an associated candle or group of candles. In another exemplary embodiment, the one or more user-selectable controls presented on the user interface include a plurality of pre-set fields, each pre-set field representing a particular mood or a particular environmental setting for an associated candle or group of candles. In this embodiment, the computer program product further includes program code for generating the sequence of data symbols that include information corresponding to a flame color for an associated candle or a group of candles. In another exemplary embodiment, the one or more user-selectable controls presented on the user interface include a music selection item that allows selection of a particular music for wireless transmission to an associated candle or a group of candles.

Another aspect of the disclosed embodiments relates to a device that includes a processor; and a memory including processor executable code. The processor executable code, when executed by the processor configures the device to present a user interface that includes one or more user-selectable controls for remotely controlling an imitation candle device or a group of imitation candle devices, wherein the one or more user-selectable controls include: a candle group or a candle device selection control, an on-off control, a timer control, and a flicker control. The processor executable code, when executed by the processor further configures the device to, upon receiving an indication of a selection of the one or more user-selectable controls, process the indication to identify the one or more selected controls and to obtain information associated with the one or more selected control, and generate a sequence of data symbols to be provided to a wireless transmitter that is configured to communicate with a selected candle device or a selected group of candle devices.

In one exemplary embodiment, the one or more user-selectable controls presented on the user interface include a plurality of pre-set fields, each pre-set field representing a particular mood or a particular environmental setting for an associated candle or group of candles. In this embodiment, the processor executable code when executed by the processor configures the device to generate the sequence of data symbols that include information corresponding to a flame color for an associated candle or a group of candles.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. An imitation candle system, comprising:
an imitation candle device including:
a removable wireless transceiver attached to the imitation candle device and configured to enable a wireless control of the imitation candle device by communicating wirelessly with a mobile user device for controlling one or more operative features of the imitation candle device to produce an appearance of a true fire flame, the removeable wireless transceiver further configured to disable the wireless control of the imitation candle device when detached from the imitation candle device;
a memory including a non-transitory computer-readable medium with processor-executable instructions included within the mobile user device that configure the mobile user device to communicate wirelessly with the wireless transceiver to modulate one or more parameters of a light source included in the imitation candle device based on a pattern corresponding to a speed of movement of a breeze provided by a sensor on the mobile user device, wherein the one or more parameters of the light source include a flicker speed and a flicker color that are set to:
a first predetermined flicker speed and a first predetermined flicker color upon the speed of movement of the breeze falling within a first range of speeds, and
a second predetermined flicker speed and a second predetermined flicker color upon the speed of movement of the breeze falling within a second range of speeds,
wherein the first range of speeds is different from the second range of speeds, the first predetermined flicker speed is different from the second predetermined flicker speed, and the first predetermined flicker color is different from the second predetermined flicker color, and
wherein the memory including the non-transitory computer-readable medium with processor-executable instructions included within the mobile user device further configure the mobile user device to communicate wirelessly with the wireless transceiver to override the flicker speed and the flicker color that correspond to the speed of movement of the breeze with a third predetermined flicker speed and a third flicker color that correspond to a pre-set option selected by a user, the pre-set option reflecting a mood or an environment and displayed by the mobile user device; and
an audio player configured to play an acoustic signal in response to the pre-set option, the acoustic signal corresponding to the mood or the environment associated with the pre-set option.

2. The imitation candle system of claim 1, wherein the sensor includes at least one of: a microphone on the mobile user device or an accelerometer coupled to the mobile user device.

3. The imitation candle system of claim 1, wherein the flicker speed of the light source calculated in real-time and based on the speed of movement of the breeze.

4. The imitation candle system of claim 1, wherein the flicker speed that is set to a zero value or a near zero value, upon the speed of movement of the breeze being zero or a near zero value.

5. The imitation candle system of claim 1, wherein the memory including the non-transitory computer-readable medium with processor-executable instructions included within the mobile user device further configure the mobile user device to:
    in response to detection of an acoustic wave received via a microphone on the mobile user device, convert the acoustic wave to a digital signal, and
    transmit the digital signal to the removable wireless transceiver for activation of a blow off feature of the imitation candle device, thereby turning off the imitation candle device.

6. The imitation candle system of claim 1, wherein the breeze is generated due to one or more of the following factors: a movement of the mobile user device, a wind blowing in close proximity to the mobile user device, or a user blowing air into a microphone of the mobile user device.

7. The imitation candle system of claim 1, wherein the speed of movement of the breeze is calculated according to a predetermined schedule.

8. The imitation candle system of claim 7, wherein the predetermined schedule is a first predetermined schedule, wherein the memory including the non-transitory computer-readable medium with processor-executable instructions included within the mobile user device further configure the mobile user device to:
    upon detecting a request to over-ride the first predetermined schedule, receive a user selection of a second schedule; and
    set the second schedule for calculating a speed of movement of the breeze.

9. The imitation candle system of claim 1, wherein the imitation candle device includes a movable flame element, and
    the memory including the non-transitory computer-readable medium with processor-executable instructions included within the mobile user device further configure the mobile user device to communicate wirelessly with the wireless transceiver to modulate a physical movement of the flame element of the imitation candle device.

10. The imitation candle system of claim 9, wherein the imitation candle device includes a coil configured to generate a magnetic field that interacts with a magnetic component of the movable flame element, and
    the memory including the non-transitory computer-readable medium with processor-executable instructions included within the mobile user device configure the mobile user device to communicate wirelessly with the wireless transceiver to modulate the magnetic field generated by the coil, thereby inducing a movement of the movable flame element in accordance with the speed of movement of the breeze.

11. The imitation candle system of claim 1, wherein:
    the processor-executable instructions included within the mobile user device further configure the mobile user device to:
    present a user interface that includes one or more user-selectable controls that include:
        a candle group or a candle device selection control,
        an on-off control,
        a timer control, or
        a flicker control;
    upon receiving an indication of a selection of the one or more user-selectable controls, process the indication to identify the one or more selected controls and to obtain information associated with the one or more selected control; and
    generate a sequence of data symbols to communicate with the imitation candle device or a selected group of candle devices.

12. The imitation candle system of claim 11, wherein the one or more user-selectable controls include a blow out control, and wherein
    the processor-executable instructions included within the mobile user device configure the mobile user device to, upon receiving an indication of a selection of the blow out control for the imitation candle device or a particular selected group of candle devices,
    generate the pattern corresponding to the speed of movement of the breeze for the imitation candle device or a particular selected group of candle devices.

13. The imitation candle system of claim 11, wherein:
    the timer control presented on the user interface includes:
    a user-selectable timer on-off field that allows operation of the imitation candle device or the selected group of candle devices to be limited within a particular time period,
    a user-settable time of day selection field that allows selection of time period within a 24-hour period, and
    a user-settable day of week field that allows selection of one or more days in a week.

14. The imitation candle system of claim 11, wherein:
    the flicker control presented on the user interface includes:
    a user-selectable light intensity selection field that allows selection of one of a plurality of light intensity level for the imitation candle device or the selected group of candle devices.

15. The imitation candle system of claim 11, wherein:
    the flicker control presented on the user interface includes:
    a user-selectable flame movement selection that allows selection of one of a plurality of movement patterns for the imitation candle device or the selected group of candle devices, wherein the plurality of movement patterns include a static pattern, a flicker pattern, or a particular speed of movement.

16. The imitation candle system of claim 11, wherein:
    the flicker control presented on the user interface includes:
    a plurality of user-selectable pre-set fields that allows selection of the pre-set option that corresponds to the mood or the environment.

17. The imitation candle system of claim 16, wherein the plurality of user-selectable pre-set fields includes at least one of: a sunrise option, a music option, an embers option, a relax option, a reading option, or a rainbow option.

18. An apparatus included within an imitation candle device, comprising:
    a removable wireless transceiver attached to the imitation candle device configured to enable a wireless control of the imitation candle device by wirelessly receiving a plurality of control signals from a mobile user device, the removable wireless transceiver further configured to disable the wireless control of the imitation candle device when detached from the imitation candle device;
    electronic circuitry configured to modulate one or both of: a light produced by a light source within the imitation candle device or a movement of a flame element of the imitation candle device based on one or more of the plurality of the control signals received from the mobile user device,
wherein modulation of the light produced by the light source or the movement of the flame element is carried out based on information obtained from the one or more of the plurality of the control signals indicative of a particular flickering effect or a flickering amount, and wherein the plurality of control signals includes (1) a first control signal including information identifying a pattern associated with a speed of movement of a breeze blowing in close proximity to the mobile user device, wherein the modulation of the light produced by the light source or the movement of the flame element is set to:
a first predetermined value upon the speed of movement of the breeze falling within a first range of speeds; and
a second predetermined value upon the speed of movement of the breeze falling within a second range of speeds, wherein the first range of speeds is different from the second range of speeds and the first predetermined value is different from the second predetermined value, and
(2) a second control signal that overrides the pattern associated with the speed of movement of the breeze, the second control signal including information corresponding to a pre-set option selected by a user, the pre-set option reflecting a mood or an environment and displayed by the mobile user device; and
an audio player configured to play an acoustic signal in response to the pre-set option, the acoustic signal corresponding to the mood or the environment associated with the pre-set option.

19. The apparatus of claim 18, wherein the removable wireless transceiver attached to the imitation candle device is configured to send a wireless signal indicating a low battery level to the mobile user device, in response to the removable wireless transceiver detecting that a voltage of a battery powering the imitation control device is less than a threshold voltage.

20. The apparatus of claim 18, wherein the removable wireless transceiver attached to the imitation candle device is configured to receive a signal indicating selection of the imitation candle device from a group of imitation candle devices, wherein the selection of the imitation candle device from the group of imitation candle devices is received from the mobile user device.

21. The apparatus of claim 18, wherein the plurality of control signals includes a third control signal including information to activate a blow off feature of the imitation candle device, wherein the third control signal includes information corresponding to an acoustic wave detected via a microphone on the mobile user device.

22. An imitation candle system, comprising:
a first removable wireless transceiver attached to a first imitation candle device configured to enable a wireless control of the imitation candle device by communicating wirelessly with a mobile user device, the first removable wireless transceiver further configured to disable the wireless control of the imitation candle device when detached from the imitation candle device;
a first electronic circuit board including electronic circuits coupled to a first light source and configured to control the first light source for illuminating a first flame element of the first imitation candle device, wherein the electronic circuits are configured to:
receive a first electrical signal from the first removable wireless transceiver, wherein the first electrical signal includes information for modulating a flicker of the first flame element, wherein the flicker of the first flame element is controlled according to a speed of movement of a breeze captured by the mobile user device, wherein modulation of the flicker of the first flame element is set to a first predetermined value upon the speed of movement of the breeze falling within a first range of speeds, and to a second predetermined value upon the speed of movement of the breeze falling within a second range of speeds, wherein the first range of speeds is different from the second range of speeds and the first predetermined value is different from the second predetermined value;
receive a second electrical signal, wherein the second electrical signal includes information for activating a blow-off feature of the second imitation candle device received from the mobile user device; and
receive a third electrical signal that overrides the speed of movement of the breeze, wherein the third electrical signal includes information corresponding to a first pre-set option selected by a user, the first pre-set option reflecting a mood or an environment and displayed by the mobile user device; and
a first audio player configured to play a first acoustic signal in response to the first pre-set option, the first acoustic signal corresponding to the mood or the environment associated with the first pre-set option.

23. The imitation candle system of claim 22, wherein modulating the flicker of the first flame element includes modulating one or more of: a flicker speed, a flicker color, and a flicker duration of the first flame element.

24. The imitation candle system of claim 23, wherein upon detection of the speed of movement of a breeze that exceeds a predetermined threshold value, the first light source is turned off.

25. The imitation candle system of claim 22, wherein the first wireless transceiver is configured to receive a timer setting signal from the mobile user device indicative of a predetermined schedule of an operation of the first imitation candle device.

26. The imitation candle system of claim 22, including a second imitation candle device that includes:
a second removable wireless transceiver coupled to the second imitation candle device configured to communicate wirelessly with the mobile user device;
a second electronic circuit board including electronic circuits coupled to a second light source and configured to control the second light source for illuminating a second flame element of the second imitation candle device, wherein, the electronic circuits of the second electronic circuit board are configured to:
receive a fourth electrical signal from the second removable wireless transceiver that includes information for modulating a flicker of the second flame element;
receive a fifth electrical signal that includes information for activating a blow-off feature of the second imitation candle device received from the mobile user device, and
receive a sixth electrical signal that overrides the fourth electrical signal, the sixth electrical signal including information corresponding to a second pre-set option selected by the user, the second pre-set option reflecting a second mood or a second environment and displayed by the mobile user device; and a second audio player configured to play a second acoustic signal in response to the second pre-set option, the second acoustic signal corresponding to the mood or the environment associated with the second pre-set option.

27. The imitation candle system of claim 26, wherein the first removable wireless transceiver and the second removable wireless transceiver are interchangeably operable with the first imitation candle device or the second imitation candle device.

28. The imitation candle system of claim 26, wherein the first removable wireless transceiver and the second removable wireless transceiver are each configured to receive a signal from the mobile user device that includes information related to controlling a particular operation in a group of commonly-controlled imitation candle devices.

* * * * *